United States Patent [19]
Koch et al.

[11] Patent Number: 5,560,456
[45] Date of Patent: Oct. 1, 1996

[54] HYDRAULIC STRUT FOR A MOTOR VEHICLE

[75] Inventors: Klaus Koch, Dahlheim; Heinz-Josef Heinrichs, Koblenz-Metternich, both of Germany

[73] Assignee: Stabilus GmbH, Koblenz, Germany

[21] Appl. No.: 341,502

[22] Filed: Nov. 17, 1994

[30] Foreign Application Priority Data

Nov. 19, 1993 [DE] Germany ............ 43 39 448.5
Sep. 6, 1994 [DE] Germany ............ 44 31 626.7

[51] Int. Cl.$^6$ ...................................... F16F 9/32
[52] U.S. Cl. .................. 188/300; 188/316; 188/317; 267/64.12
[58] Field of Search ............................. 188/300, 314, 188/316, 313, 317, 281, 322.22; 248/354.1; 267/64.12, 120; 296/146.8, 56

[56] References Cited

U.S. PATENT DOCUMENTS

| | | | |
|---|---|---|---|
| 4,099,602 | 7/1978 | Kourbetsos | 188/300 |
| 4,307,874 | 12/1981 | Reuschenbach | 188/300 |
| 4,881,723 | 12/1989 | Bauer | 267/64.12 |

FOREIGN PATENT DOCUMENTS

| | | |
|---|---|---|
| 1459182 | 1/1969 | Germany. |
| 0739133 | 10/1955 | United Kingdom. |
| 2012913 | 8/1979 | United Kingdom. |
| 1583414 | 1/1981 | United Kingdom. |
| 2122305 | 1/1984 | United Kingdom. |
| 2195704 | 4/1988 | United Kingdom. |

*Primary Examiner*—Robert J. Oberleitner
*Assistant Examiner*—C. T. Bartz
*Attorney, Agent, or Firm*—Nils H. Ljungman and Associates

[57] ABSTRACT

A hydraulic strut for a motor vehicle for providing a movement guiding and dampening function can generally have a cylinder, with a piston disposed in the cylinder to divide the cylinder into at least first and second chamber portions, with a piston rod extending from the piston out of the cylinder. The cylinder can be sealed at both ends, and can preferably be filled with hydraulic fluid. The piston can preferably define a flow connection between the two fluid chambers, and this flow connection can typically have some sort of valve arrangement therein for controlling flow of fluid between the first and second chamber portions.

24 Claims, 15 Drawing Sheets

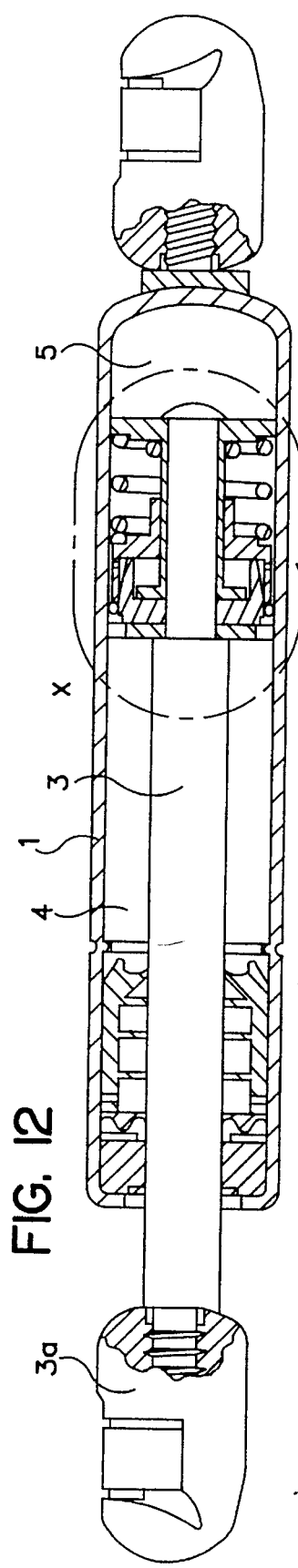
FIG. 12
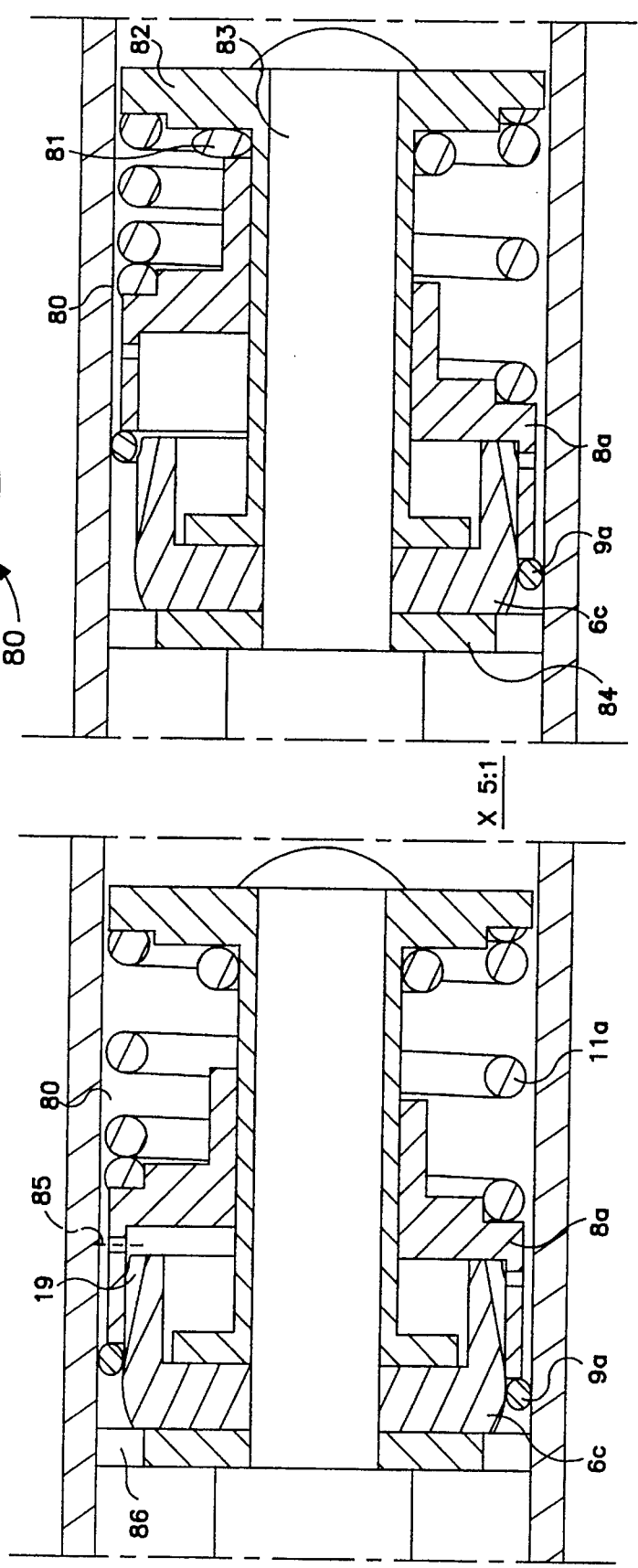
FIG. 12b
FIG. 12a

HYDRAULIC STRUT FOR A MOTOR VEHICLE

BACKGROUND OF THE INVENTION

1. Field of the Invention

This invention relates to a hydraulic strut for a motor vehicle for providing a movement guiding and dampening function. Such a strut can generally have a cylinder, with a piston disposed in the cylinder to divide the cylinder into at least first and second chamber portions, with a piston rod extending from the piston out of the cylinder. The cylinder can be sealed at both ends, and can preferably be filled with hydraulic fluid. The piston can preferably define a flow connection between the two fluid chambers, and this flow connection can typically have some sort of valve arrangement therein for controlling flow of fluid between the first and second chamber portions. Such a piston-cylinder arrangement is typically well known for items such as shock absorbers for suspension systems of a motor vehicle. By means of attachment devices, the cylinder can then be attached to a first object, i.e., a first portion of a motor vehicle and the extending end of the piston rod can be attached to a second object, i.e. a second portion of a motor vehicle.

The strut can thereby guide movement between the first and second objects while providing a fluid dampening function. In addition to providing a movement guiding function, such a strut can also be used for essentially maintaining a relative positional relationship between the two objects to which it is attached, and for this function, can preferably be designed for providing a position locking device for positioning objects which are movable with respect to one another. Such a positioning device can have a hollow cylinder which can be connected to one of the objects and a piston which can be displaced in the hollow cylinder, which piston can be connected to the other object by means of a piston rod which runs out of the hollow cylinder. The piston can divide the externally-closed hollow cylinder into two working chambers, which working chambers can have variable volumes containing a working fluid and/or a gas, whereby the flow connection between the two working chambers is possible at least partly by means of an exchange device in the piston.

2. Background Information

One such strut device is disclosed by German Patent Application No. 14 59 182 C2.

Known devices have a cylinder which is closed on both ends, with a piston rod which extends through one end of the cylinder in a sealed manner. Inside the cavity of the cylinder, the piston rod is connected to a piston, which piston divides the cylinder into two working chambers. The two working chambers are connected to one another by means of two flow passages which run inside the piston. For each direction of movement there is a non-return valve which can open only in one flow direction. Each non-return valve comprises a valve body which is prestressed by a spring in the blocking position against an inflow opening, and which blocks the opening when the piston is stationary. When the piston rod is moved relative to the cylinder, an overpressure builds up in one of the working chambers. This overpressure acts on the corresponding non-return valve. When the piston rod begins to move, this pressure initially acts only on a small area of the surface of the valve body, which area is defined by the cross section of the inflow opening corresponding to the valve body. A significant overpressure in the working chamber is therefore required to lift the valve body from the sealing position. After the flow between the two working chambers begins, pressure is exerted on a larger area of the surface of the valve body.

This known solution makes it possible to hold a door in a relatively stable manner in any desired position between its open position and its closed position. A relatively large force must be applied to start to move a door or similar object which has been arrested in a desired position. The door therefore essentially remains in its position even in the event of an unintentional impact. On the other hand, a relatively small force is required to open or close the door, once the door has been set in motion. This action, which is itself advantageous, is unfortunately achieved only at the expense of an increase in the cost and complexity of the design and construction, which has so far kept this principle from being adopted in widespread applications. The added cost and complexity of design and construction results from the fact that there must be two flow paths between the two working chambers. These two flow paths require a number of holes which form the flow paths, some of which are axial holes which must be located eccentrically in the piston.

OBJECT OF THE INVENTION

The object of the present invention is to create a position locking device to hold in position two objects which can be moved in relation to one another, and which position locking device includes an economical hydraulic, pneumatic or hydropneumatic blocking element, which makes it possible to hold doors, windows, etc. in essentially any desired position without any external actuation elements, whereby the level of the blocking force is maintained as necessary.

SUMMARY OF THE INVENTION

The present invention teaches that the above object can be achieved by a position locking device, in which the fluid exchange device preferably has at least two parts which can be moved relative to one another, whereby a flow connection can preferably be opened after displacement from a base position which is assumed when the device is at rest.

The invention also teaches that a simple piston construction can make possible the use of economical parts which can preferably be incorporated in the installation easily and without requiring any special measures to create a reliable system. The system functions reliably even under changing temperature conditions.

In one favorable embodiment, the exchange device can preferably be a two-piece piston.

The present invention also teaches that the piston can preferably be divided into a radially outer part and a radially inner part, whereby the two parts can be moved relative to one another in an axial direction.

In the embodiment with the radially disposed piston parts, it can be advantageous that the radially inner part preferably be held in a sealed manner on the piston rod, and that the radially outer part preferably be mounted in a sealed manner with respect to the hollow cylinder.

The present invention also teaches that the exchange device can preferably have a part which is held stationary, and a part which is movable for each of the decompression and compression directions.

The present invention also teaches that at least one of the parts which can move relative to the stationary part can preferably be flexibly supported.

In one favorable embodiment, the flow connection can preferably be formed by the facing surfaces of the parts, wherein at least one of the surfaces can preferably have a conical curvature.

The present invention also teaches that the flow connection can be formed by the facing surfaces of the parts so that there can preferably be a wedge-shaped groove which runs axially in at least one of the surfaces. It can thereby be advantageous that such a groove can make possible a particularly soft, or smooth, equalization of pressure between the blocking pressure and the dynamic pressure, so that no unpleasant switching noises would be generated during use of the device.

In one configuration, the flow connection can preferably be located in one of the parts as a recess which runs preferably at an angle to the longitudinal axis, whereby there can preferably be blocking means in the neighboring part.

The present invention also teaches that the parts which can move relative to one another can be located axially one behind the other.

In one favorable embodiment, the piston ring enclosed between the parts can preferably be designed as a blocking means for the flow connection.

In an additional configuration, the flow connection can preferably be provided with a throttle valve.

The present invention also teaches that there can preferably be a spring-loaded and/or gas-filled equalization chamber located in the hollow cylinder.

In one favorable embodiment, the piston rod can preferably run through both working chambers.

In an additional configuration, an additional fluid-filled chamber can preferably be formed in the hollow cylinder by means of a partition, whereby the exchange device can preferably be located in the piston and/or in the partition.

To at least partly compensate for the force of the supporting spring, an additional configuration of the present invention teaches that at least one of the axially movable parts can preferably be provided with an arresting element. In this case, the arresting element can advantageously be a snap, spring and/or a friction element.

Such a positioning device as described briefly above, can be used for holding doors, windows, hoods, trunk lids, hatchbacks etc. in various open positions. The embodiments of the present invention as outlined briefly hereabove, will be discussed further herebelow with reference to the accompanying drawings. It should be understood that when the word "invention" is used in this application, the word "invention" includes "inventions", that is, the plural of "invention". By stating "invention", applicant does not in any way admit that the present application does not include more than one patentably and non-obviously distinct invention, and maintains the possibility that this application may include more than one patentably and non-obviously distinct invention. The Applicant hereby asserts that the disclosure of this application may include more than one invention, and, in the event that there is more than one invention, that these inventions may be patentable and non-obvious, one with respect to the other.

One aspect of the invention resides broadly in a hydraulic strut for a motor vehicle for absorbing shock and providing damping, the hydraulic strut having a rest configuration, the hydraulic strut comprising: a cylinder, the cylinder having a first axial end and a second axial end; apparatus for connecting the cylinder to a first object; piston apparatus disposed within the cylinder, the piston apparatus dividing the cylinder into first and second chamber portions; piston rod apparatus, the piston rod apparatus having a first end connected with the piston apparatus, and a second end extending from the piston apparatus out of the first end of the cylinder; apparatus for connecting the second end of the piston rod apparatus to a second object; hydraulic fluid disposed within the first and second chamber portions; the piston apparatus comprising flow passage apparatus fluidly connecting the first and second chamber portions; at least first and second valve portions disposed within the piston, the first and second valve portions having a base configuration for closing the flow passage, the first and second valve portions being in the base configuration in the rest configuration of the strut; and at least one of the first and second valve portions being movable from the base configuration with respect to the other of the first and second valve portions to open the flow passage after movement of the piston rod apparatus within the cylinder.

Another aspect of the invention resides broadly in a hydraulic strut for positioning a first object with respect to a second object, the strut having a rest configuration for maintaining a selected position of the first object with respect to the second object, the strut comprising: a cylinder, the cylinder having a first axial end and a second axial end; apparatus for connecting the cylinder to one of: a) the first object, and b) the second object; piston apparatus disposed within the cylinder, the piston apparatus dividing the cylinder into first and second chamber portions; piston rod apparatus, the piston rod apparatus having a first end connected with the piston apparatus, and a second end extending from the piston apparatus out of the first end of the cylinder; apparatus for connecting the second end of the piston rod apparatus to the other of: a) the first object, and b) the second object; the piston apparatus comprising flow passage apparatus fluidly connecting the first and second chamber portions; at least one first and at least one second valve portion, the first and second valve portions having a base configuration for closing the flow passage, the first and second valve portions being in the base configuration in the rest configuration of the strut; and at least one of the first and second valve portions being movable from the base configuration with respect to the other of the first and second valve portions to open the flow passage after movement of the piston rod apparatus within the cylinder.

A further aspect of the invention resides broadly in a device for positioning two objects, movable in relation to one another, and maintaining a position of the two objects with respect to one another, the device comprising: a cylinder, the cylinder having a first axial end and a second axial end; apparatus for connecting the cylinder to one of the two objects; piston apparatus disposed within the cylinder, the piston apparatus dividing the cylinder into first and second chamber portions; piston rod apparatus, the piston rod apparatus having a first end connected with the piston apparatus, and a second end extending from the piston out of the first end of the cylinder; apparatus for connecting the second end of the piston rod apparatus to the other of the two objects; the piston apparatus comprising flow passage apparatus fluidly connecting the first and second chamber portions; the piston apparatus comprising at least first and second piston parts, the first and second piston parts having a base configuration for closing the flow passage; at least one of the first and second piston parts being movable with respect to the other of the first and second piston parts to open the flow passage; and apparatus for permitting movement of the movable one of the first and second piston part a substantial distance prior to opening of the flow passage.

BRIEF DESCRIPTION OF THE DRAWINGS

Preferred embodiments of the present invention are schematically illustrated in the accompanying drawings, in which:

FIGS. 2 to 8 show additional embodiments of an arresting device which differ in certain details, from the embodiment of FIG. 1a;

FIGS. 12, 12a and 12b illustrate an additional embodiment of an arresting device;

DESCRIPTION OF THE PREFERRED EMBODIMENTS

Figure 1:
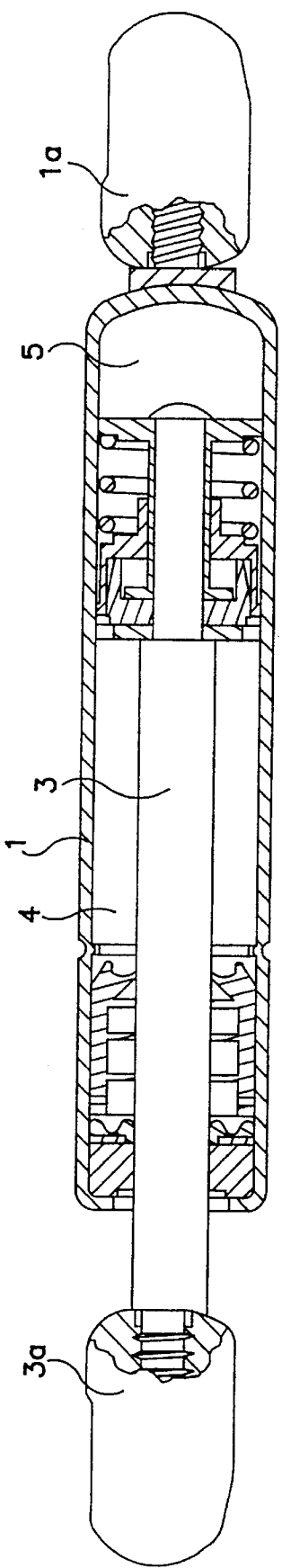
FIG. 1 shows one type of hydraulic strut device and connections for connecting the device to different objects.
Figure 1A:
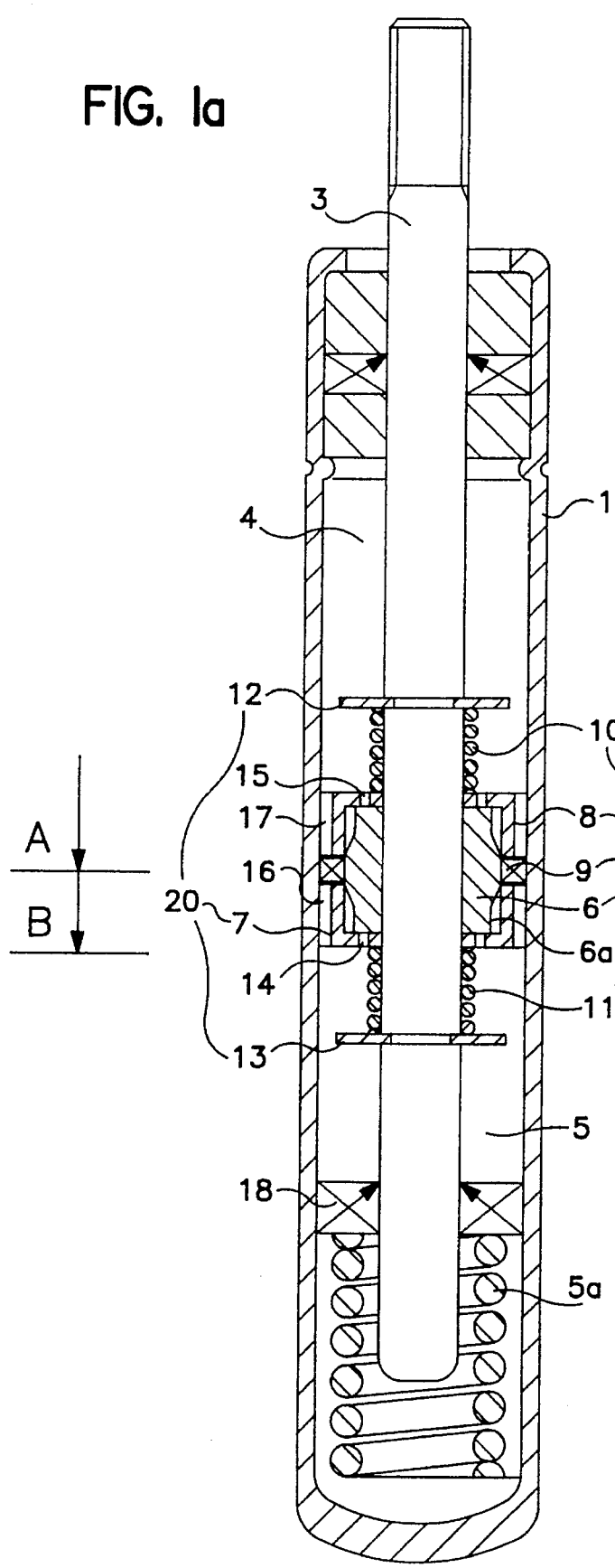
FIGS. 1a, 1b and 1c show an arresting device having a hollow cylinder, a piston rod and an exchange device in cross section.

FIGS. 1 and 1a shows a hollow cylinder 1 which essentially defines an externally-sealed chamber therewithin. A piston rod 3 can preferably be disposed within the chamber, and can sealingly extend out of the cylinder 1. The cylinder 1 can preferably have a first fastening device 1a for connecting the piston 1 to a first object, and the piston rod 3 can preferably have a second fastening device 3a for fastening the piston rod to a second object.

The chamber can preferably be filled with a working fluid, liquid or gas, and can be divided into two separate working chambers 4 and 5 by a piston system 20, as shown in FIG. 1a. The piston system 20 can preferably be connected, on both sides thereof, to the piston rod 3. The piston system 20 preferably comprises a piston 6 which can advantageously be permanently connected, for example, by an adhesive, mechanical, interlocking or friction connection, to the piston rod 3, a sealing element 9, two parts 8 and 7 which can preferably move relative to the piston 6, two prestress elements 10 and 11, and two fixing elements 12 and 13 for positioning the prestress elements 10 and 11.

In the rest position of the arresting device, the parts 8 and 7 are preferably pushed against the piston 6 by the prestress elements 10 and 11. Thus, in the rest position, the sealing element 9 can be pushed into a defined position, in which the sealing element 9 preferably sealingly separates the working chambers 4 and 5. If, for example, tension is exerted on the piston rod 3 during a withdrawal or insertion of the piston rod 3, the separation or sealing of the working chambers 4, 5 by the sealing element 9 essentially results in an increase in pressure in one of the working chambers 4 or 5.

When the piston rod 3 is withdrawn out of the cylinder 1, there would essentially be an increase in pressure within the chamber 4. This increased pressure can be exerted, via a flow passage 17, preferably on the sealing element 9. The sealing element 9 can then preferably come into contact with the part 7, and an axial displacement force can thereby be exerted on the part 7. This axial displacement force preferably pushes the part 7 against the force of the opposing prestressing element 11. The part 7 can preferably be held in position by the prestress element 11, which prestress element 11 can preferably be, in turn, supported by the fixing element 13.

Figure 1B:
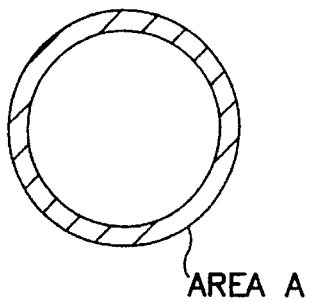

If, as a result of a sufficient tensile force on the piston rod 3, a pressure is generated in the working chamber 4 such that the axial displacement force of the seal element 9 (resulting from the pressure and the hydraulic cross section area A of the sealing element 9, see FIG. 1b) is greater than the support force of the prestressing element 11, the sealing element 9 can preferably push the part 7 axially away from the piston 6, thereby enabling the sealing element 9 to leave its sealing position. On account of the special contour of the piston 6, which contour can preferably be somewhat conical in at least one embodiment of the present invention, the sealing element 9 can lose its sealing function, so that working fluid can preferably flow from the working chamber 4 through the flow connection, or connections 17, and into the space 6a between the piston 6 and the part 7. The space 6a can preferably be connected to the working chamber 5 by means of a hole, or holes 14, thereby enabling flow of the fluid into the chamber 5.

Preferably after the working fluid has flowed into the space 6a and flowed into the working chamber 5 via the hole 14, the blocking pressure in the working chamber 4 will essentially be reduced to a low dynamic pressure. This low dynamic pressure, bearing on the larger hydraulic surface area B of the part 7, can preferably continue to hold the part 7 in the rearmost position, i.e. open.

As a result of the connection of the working chambers 4 and 5 by means of the flow connection 17 and the holes 14, it can be possible to position the piston 6 and thus the piston rod 3. A flow connection 16 can preferably be sealed in this position by the sealing element 9.

Therefore, after overcoming an initially high blocking force to initially move the piston rod 3, it can be possible to make the position adjustment by exerting only a slight adjustment force during the remaining movement of the piston rod 3.

Figure 1C:
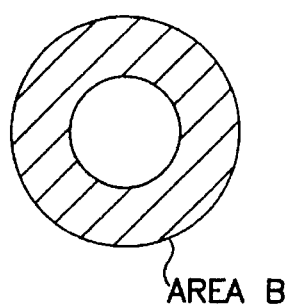

If the movement of the piston rod 3 is stopped, there can then be a pressure equalization between the working chambers 4 and 5 so that no further opening force (resulting from the dynamic pressure and the resulting surface area B, see FIG. 1c) can be exerted on the sealing element 9. Then, preferably as a result of the force of the prestressing element 11, the part 7 can be pushed against the piston 6, and thus the sealing element 9 can be pushed back into its sealing position, whereupon the working chambers 4 and 5 can preferably again be separated from one another to retain the attained relative positioning between the piston rod 3 and the cylinder 1.

As a result of a special contour of the external surface of the piston 6, preferably in the axial direction of the piston 6, a soft, or smooth, transition can essentially be possible between blocking pressure and dynamic pressure. Thus, a smooth equalization of pressure can preferably be achieved between the blocking pressure and the dynamic pressure. In addition, on account of the friction between the sealing element 9 and the hollow cylinder 1, there can preferably be an essentially secure seal of the flow connections 16 and 17, depending on the direction of movement of the piston assembly 20 within the cylinder 1.

The sequence of operations described above essentially also takes place in the direction of insertion of the piston rod 3 into the cylinder 1, but now resulting in movement of the part 8 against the prestressing element 10. Thus, when the valve is open in an insertion operation, the working fluid can essentially flow from the working chamber 5 through the flow passage, or passages 16 and a hole, or holes 15 into the working chamber 4.

In a further feature of this embodiment of FIG. 1a, a variable sealing element 18, can preferably be provided within the cylinder 1 to possibly externally seal and prestress the working chamber 5 (e.g. via a coil compression spring 5a, or gas cushion, etc.). Thus, during insertion and removal of the piston rod 3 into and out of the chamber 5, and when there is a change in temperature, it can preferably also be possible to allow for a volume equalization within the cylinder 1 when the working fluid is a liquid on account of the presence of the variable sealing element 18.

The sealing element 9 can preferably be an O-ring, a rectangular cross-section ring, or a specially-designed gasket with or without reinforcements, e.g. made of steel, plastic or rubber materials, or other sealing materials. The working fluid can preferably be any type of known liquid and/or gas media, such as oils and gases, which are commonly used for hydraulic and pneumatic cylinders.

In the embodiment as discussed above with reference to FIG. 1a, the sealing element 9 is moved a substantial distance before the sealing engagement between the sealing element 9 and the piston 6 is lost. This distance that the sealing element 9 is moved can thereby possibly cause the positioning device to require that a greater force be applied before the flow connection opens, thereby possibly enabling the device to remain in its position even if bumped, or possibly subjected to a wind gust. In further embodiments as discussed below, with reference to FIGS. 3–6, for example, where there is essentially no travel distance before opening of the flow connection, it can be preferable that the sealing element 9 have a compressibility so that some of the force applied to the piston 3 could possible be absorbed before an opening of the flow connection occurred, thus, also possibly enabling such a device to retain its position even if slightly bumped or subjected to a wind gust.

Figure 2:
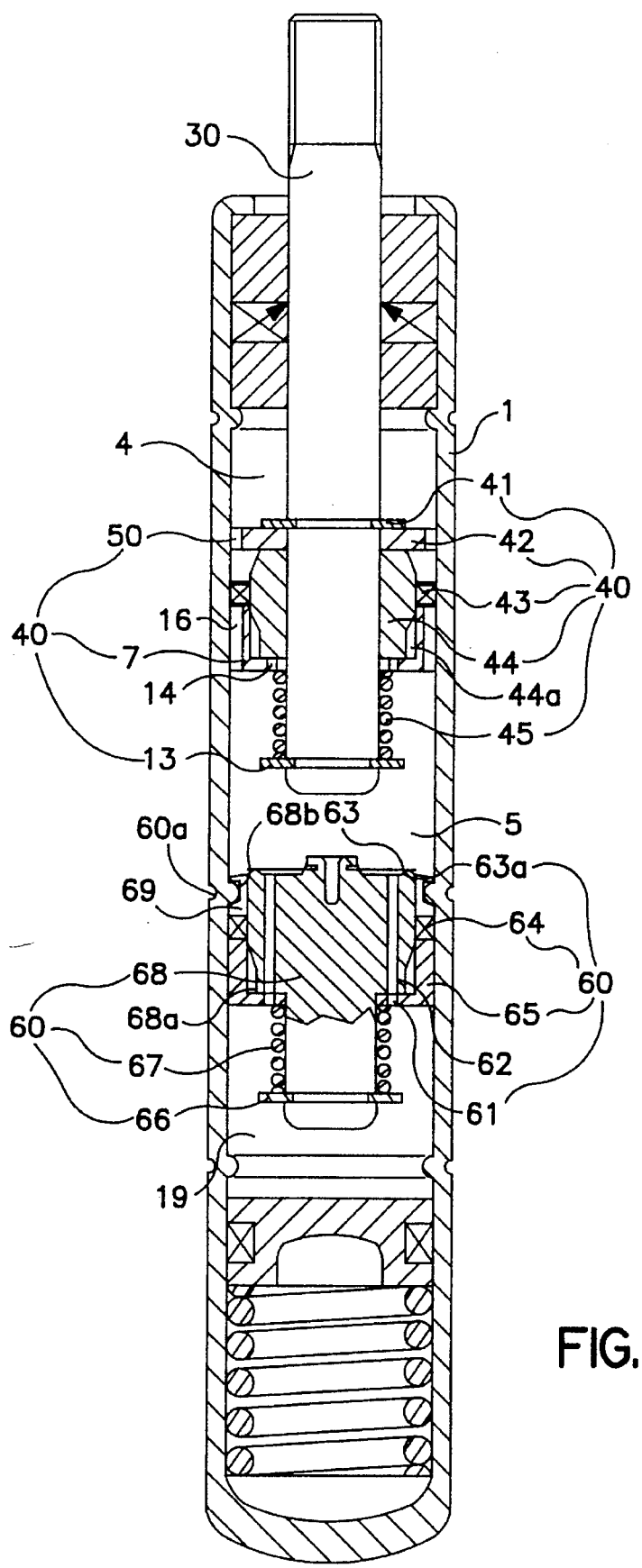

FIG. 2 illustrates an additional possible embodiment for varying the piston system so that a valve function can preferably be provided on a piston rod 30, by a piston system 40, and an additional valve function can preferably be provided by means of a partition arrangement, or valve system 60 in the hollow cylinder 1. This embodiment has the advantage that the arresting device can be shorter because of the elimination of a long piston rod 3 as is shown in FIG. 1a.

If tension is exerted on the piston rod 30, i.e. to withdraw the piston rod 30, the piston system 40, preferably located on the piston rod 30, can be used and can essentially operate in the same manner as the valve assembly 20 described with reference to FIG. 1a. As such, the pressure in chamber 4 can press on the sealing member 43, to press the part 7 against the force of the prestressing element 45 which is preferably positioned by means of fixing element 13. Upon displacement of the sealing member 43 axially out of its sealing position about piston 44, the fluid from chamber 4 can preferably flow into the space a 44a, between the piston 44 and the part 7, and then into chamber 5, via the hole 14. Simultaneously, since the piston rod 30 is being withdrawn from the cylinder, the volume space occupied by the piston rod 30 becomes less. This volume space can preferably be filled with working fluid which can flow from a chamber 19 via flow holes 61 and 62 into the working chamber 5.

In this flow direction, valve plates 63, preferably located on the valve system 60, preferably are configured so that there will essentially not be a blocking of the fluid flow. For this purpose, the valve plates 63 can be configured to simply lift away from a corresponding valve seat portion 63a, and thus open the passage. In this embodiment of FIG. 2, the valve system 60 can be maintained in place within the cylinder 1, preferably by means of an impression 60a into the cylinder 1, which impression 60a can preferably engage a notch 68b of the valve body 68.

If a force is exerted on the piston rod 30 in the compression direction, a pressure can build up in the working chamber 5. This increased pressure in the chamber 5 can lead to an actuation of the valve system 60 preferably located in the hollow cylinder. In essence, the valve system 60 can preferably have similar components to the valve system 40, and can thereby, like valve system 40, essentially function according to the same principle as the valve system 20 illustrated in FIG. 1a. As such, fluid can flow through the passage 69, and the pressure of the fluid can press onto the sealing member 64, to press the part 65 against the force of the prestressing element 67 which is positioned by means of fixing element 66. Upon displacement of the sealing member 64 axially out of its sealing position about valve body 68, the fluid from chamber 5 can preferably flow into the space 68a, between the valve body 68 and the part 65, and then into chamber 19, via the hole 61.

Simultaneously, the pressure in the working chamber 5 can cause the sealing element 43 to be pushed out of its sealing position, away from the part 7 and against plate 42, which sealing plate 42 can be fixed in position between the piston 44 and a fixing member 41. Thus, the working fluid can flow from the working chamber 5 via the flow connection 16 and 50 into the working chamber 4.

The above discussed sequence of motions can essentially be controlled exclusively by the valve system 60 located in the hollow cylinder 1.

If the movement of the piston rod 30 is stopped, there can be a pressure equalization between the working chamber 5 and the chamber 19, so that there will essentially no longer be an opening force generated on the sealing element 64. As a result of the force of the prestressing element 67, the part 65 can then be pressed against the valve body 68, and thus the sealing element 64 can preferably be pushed into its sealing position.

The apparatus can thus be blocked in the compression direction of the piston rod 3. In the decompression direction, that is, if pulling tension were exerted to withdraw the piston 30, the sealing element 43, on account of the pressure in the working chamber 4 would essentially immediately be pushed into the sealing position. Thus, in this decompression direction, too, on account of the friction of the sealing element 43 on the hollow cylinder 1, the arresting device would preferably be blocked.

Figure 3:
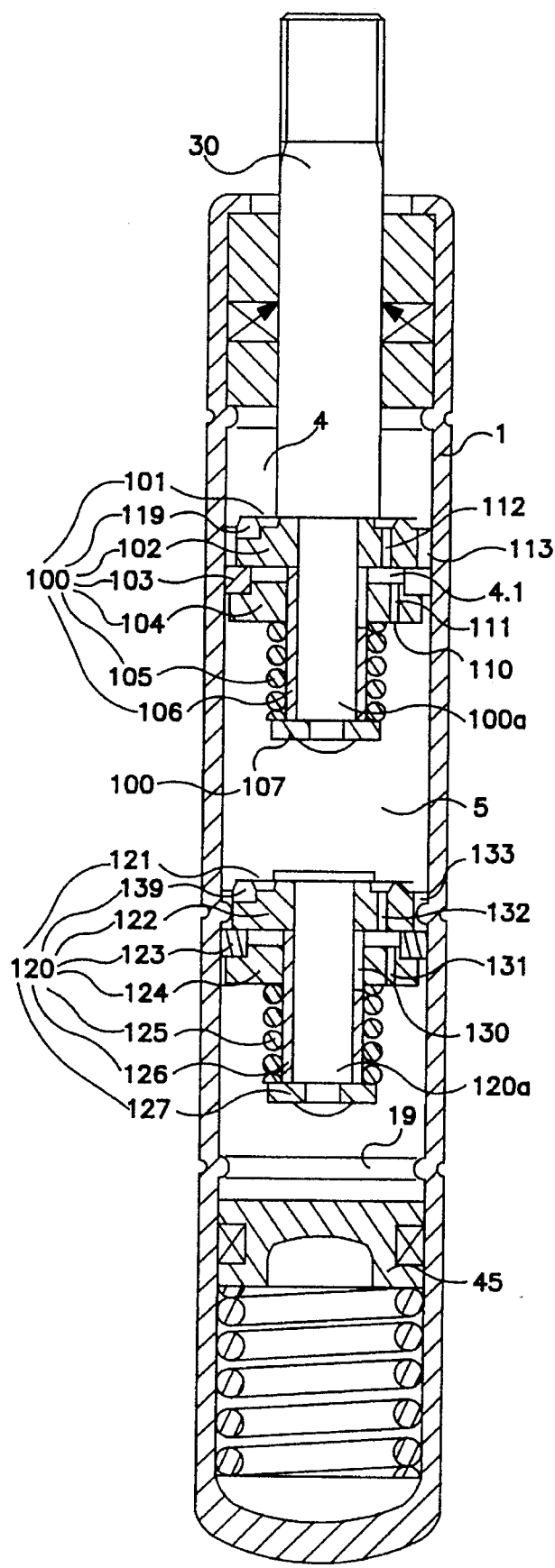

FIG. 3 illustrates another possible piston system 100 which preferably has a valve plate 101, a piston 102, a sealing element 103, a support plate 104, a prestress element 105, a sleeve 106 and a fastening element 107. If a force is applied to the piston rod 30 in the decompression direction, i.e., withdrawal of the piston rod 30, a pressure can build up in the working chamber 4. This pressure can push the valve plate 101 against the piston 102, and thus seal a hole 112. The pressure can also be exerted via flow passage 113 on the sealing element 103. Thus, the sealing element 103 can preferably be pressurized in the axial direction with a force resulting from the pressure and the hydraulic cross section of the flow passage 113. As a result of the prestress element 105, the sealing element 103 can preferably be held in the sealing position by means of support plate 104. If the pressure in the working chamber 4 is sufficient to overcome the pressure force on the sealing element 103, that is, the prestress of the prestress element 105, the sealing element 103 and the support plate 104 can essentially be displaced axially, so that the working fluid can flow from the working chamber 4 via the flow connection 113 into a space 4.1.

The flow connection 110 in the sleeve 106 can preferably be closed by the displaced support plate 104. Since the pressure can now typically be exerted on essentially the entire surface area of the support plate 104 and of the sealing element 103, the support plate 104 can be displaced toward the prestress element 105. The fluid medium can then flow through the flow hole 111 from the space 4.1 into the working chamber 5. The pressure in the working chamber 4 can thereby be reduced to a lower pressure level, so that movement of the piston rod 30 can be possible with an even lower force. But the valve of the piston system remains open, since the axial force resulting from the dynamic pressure of the hydraulic cross section surface, which is now larger, is essentially greater than the force of the prestress element 105.

As a result of the presence of a preferably positionally fixed valve unit 120 in the hollow cylinder 1, the volume space that was occupied by the piston rod 30 during a withdrawal of the piston rod 30 can preferably be filled by incoming working fluid flowing from the chamber 19 into the working chamber 5 via the flow passages 130, 131 and 132. The valve plate 121 of the valve unit 120 can preferably be designed and oriented in the valve system 120 so that in this flow direction of fluid from chamber 19 into chamber 5, the valve plate 121 can be pushed from the seal seat of the partition 122, and thus an unhindered flow can be possible. The seal seat can be provided by a sealing edge of the partition 122, or, if desirable, as shown on the left half portion of partition 122, the seal seat can alternatively be formed by a sealing edge of a seal ring 139.

If a force in the compression direction is exerted on the piston rod 30, a pressure can build up in the working chamber 5. This pressure in chamber 5 can thereby lead to an actuation of the valve system 120 which is preferably located in the hollow cylinder 1. In essence, the valve system 120 is configured similarly to the valve system of the piston system 100, and can thus operate in essentially the same manner as the valve system of piston system 100. As such, the fluid in chamber 5 can pressurize the seal element 123 via flow passage 133. When the force on seal element 123 becomes sufficient to overcome the pressure of prestressing element 125, braced by fixing member 127, the support plate 124 can be displaced axially on the sleeve 126. This, in effect can then open the flow passage 133 to allow fluid to flow via passage 131 into chamber 19.

Simultaneously, the working fluid can flow into the working chamber 4 out of the working chamber 5, via the flow channel 110, the flow hole 111 and the flow hole 112. The valve plate 101 can preferably be designed and located in the piston system 100 so that in this direction of flow from chamber 5 into chamber 4, the valve plate 101 can preferably be pushed away from the sealing seat of the piston 102, and thus an unhindered flow can become possible. The valve seat of piston 102 can, if desirable, be provided by means of a special sealing edge on the piston or by means of an additional sealing element 119.

In this direction of actuation, whereby the piston rod 30 is being inserted into cylinder 1, the working fluid can flow from the working chamber 5 via the piston system 100 into the working chamber 4, and via the valve system 120 into the chamber 19. The sequence of motion can essentially be exclusively controlled by the valve system 120 located in the hollow cylinder 1.

If the motion of the piston rod 30 is stopped, there can be a pressure equalization between the working chamber 5 and the chamber 19, whereupon there would typically be no further opening force on the sealing element 123 and on the valve plate 101. As a result of the force of the prestress element 125, the support plate 124 and the sealing element 123 can thereby preferably be pushed into the sealing position against the piston 122, so that the flow passage 133 can be closed again.

The arresting device can thus be locked in both the compression direction and in the decompression direction.

As a result of the presence of a separating piston 45 preferably disposed in the hollow cylinder 1, it can be possible to adjust the volume within the chamber 5, that is, the volume displaced during the insertion of the piston rod 30, the volume required following the extraction of the piston rod 30, and any volume changes which can occur in the event of temperature changes, in particular when hydraulic fluid is the medium used.

In this embodiment, it can also be possible to design the flow passages 113 and 133 so that, by interacting with the prestress elements 105 and 125, there can be a large variation in the blocking forces. In one possible embodiment of the present invention, the blocking force could preferably be increased by decreasing the size of the flow passages 113 and/or 133, thereby reducing the hydraulic area being acted upon by the fluid. Alternatively, prestress elements 105, 125 could be provided which have a stronger spring force, thereby requiring a higher fluid pressure to overcome the spring force and open the flow passages.

It is also possible to realize the flow connection 113 and 133 so that the flow channels 113 and 133 can be kept open automatically at different piston speeds. For this purpose, the dimensions of the channels 113 and 133 could preferably be altered, in known ways, to alter the hydraulic and/or pneumatic characteristics of the valves.

An additional possibility is to design the holes 111 and 131 so that actuation can essentially be possible only if the high blocking force is permanently overcome. With such a design, the sleeves 106 and 126, as well as the flow holes 111 and 131, can essentially be eliminated if there is sufficient space between the support plates 104 and 124 and central pins 100a and 120a.

Figure 4:
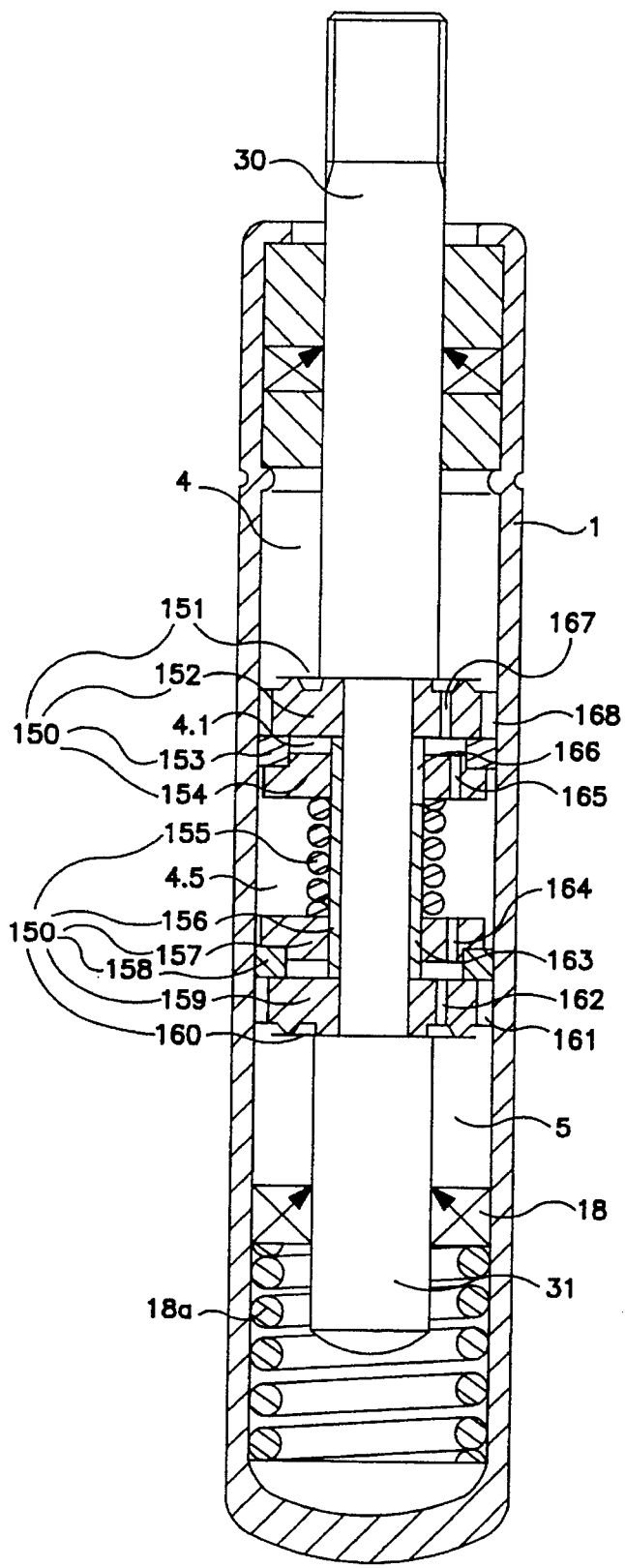

FIG. 4 illustrates a dual-action piston system 150 on the piston rods 30 and 31, whereby the components and principle of operation are essentially the same as the embodiment illustrated in FIG. 3.

If a decompression force is exerted on the piston rod 30, a pressure can build up in the working chamber 4, which pressure can be exerted, via the flow channel 168, on the sealing element 153. Simultaneously, the valve plate 151 can be pressed onto the sealing seat of the piston 152, whereupon the flow hole 167 can be sealed. If the pressure force resulting from the pressure in the working chamber 4 and the cross section of the flow channel 168 is greater than the force of the prestress element 155, the sealing element 153 and the support plate 154 can preferably be displaced against the prestress element 155.

The working fluid can then preferably flow through the flow channel 168 and through the flow hole 165 into the space 4.5, and from there via the flow channel 163, the flow hole 164 and the flow hole 162 into the working chamber 5. The valve plate 160 can preferably be realized and located in the valve system 150 so that in this direction of flow of fluid from chamber 4 into chamber 5, the valve plate 160 can be raised from the sealing seat of the piston 159 and thus an unhindered flow can become possible.

On account of the increased cross section resulting from the surface of the support plate 154 and of the sealing element 153, a dynamic pressure which is less than the opening pressure upstream of the support plate 154 in the space 4.1 can essentially be sufficient to keep the flow channel 168 open and thus to maintain the flow of fluid through the valve system.

If the movement of the piston rod 30 out of the cylinder 1 is stopped, the sealing element 153 can preferably be pushed by the prestress element 155, and by means of the support plate 154, can be pushed back into the sealing position on the piston 152, so that the arresting device can be blocked.

When a load is exerted on the piston rod 30 in the compression direction, the principle of action can essentially be the same as in the decompression direction, but the sealing element 158 and the support plate 157 are displaced against the support element 155. This enables fluid to flow through passages 161 and 164 into the space 4.5, and from the space 4.5, through passages 165, 166 and 167, into chamber 4.

In this embodiment, an inner sleeve 156 can preferably be provided to thereby define the passages 163 and 166. Also, a separating piston 18 and biasing member 18a can also be provided for a volume compensation function as has been discussed previously.

Figure 5:
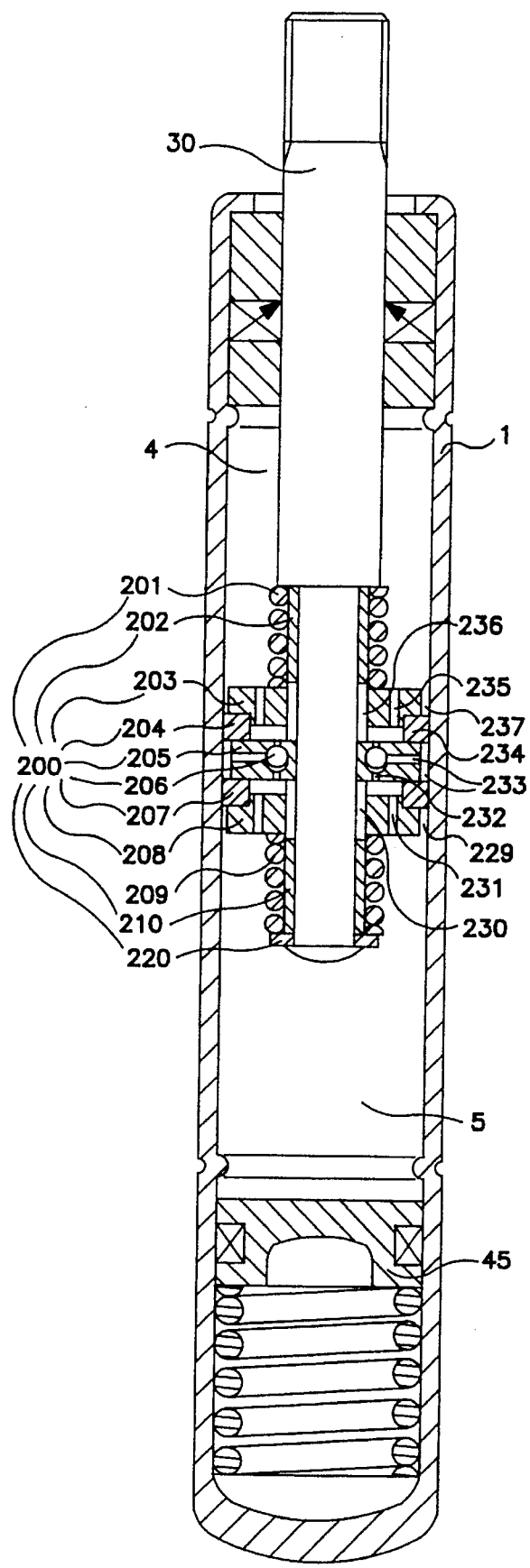

FIG. 5 shows an additional embodiment of a hydropneumatic arresting device with a piston system 200. The piston system 200 can preferably have two support plates 203 and 208, with corresponding annular gaps 237 and 229 preferably formed thereabout, whereby sealing elements 204 and 207 respectively seal the plates 203 and 208 to the cylinder.

If a load is exerted on the piston rod 30 in the decompression direction, a pressure can build up in the working chamber 4, which pressure can be exerted by means of the flow holes 235, 236 (with hole 236 preferably formed by sleeve 202) and 234 and the flow channel 233 onto the sealing element 207. A ball 206 can thereby be actuated by the pressure in the flow passage 234, and can thereby close the flow channel 232.

If the pressure force resulting from the pressure exerted and the effective cross section of the flow channel 233 is greater than the support force of the prestress element 209, braced by fixing member 220, the sealing element 207 and the support plate 208 can preferably be displaced against the prestress element 209. Then the pressure can preferably be exerted on essentially the entire annular surface of the support plate 208. The working fluid can then flow via the flow channel 231 from the working chamber 4 into the working chamber 5. Working in this direction of flow, the flow channel 230, preferably formed by cylindrical sleeve 210 can be closed by the displaced support plate 208. As a result of the discharge of the working fluid, the blocking pressure can be reduced to a lower dynamic pressure, so that the piston rod 30, after the high blocking force is overcome, can be moved with a reduced adjustment force.

If the movement of the piston rod 30 is stopped, there can essentially be a pressure equalization between the working chamber 4 and the working chamber 5, whereupon the sealing element 207 can be pushed into its sealing position on the piston 205. The arresting device can thereby be blocked, since the ball 206 can essentially block the channel 232.

If pressure is exerted on the piston rod 30 in the compression direction, the sequence of operations would essentially be the same as in the decompression direction, but the ball 206 would preferably be forced to block the upper channel 234, thereby diverting the fluid pressure against sealing element 204, and the sealing element 204 would be pushed against the prestress element 201, via the support plate 203.

With suitable cross sections of the flow holes 235 and 231, the actuation forces required to move the piston rod can be influenced, as well as the speed at which the piston rod makes the adjustments.

Figure 6:
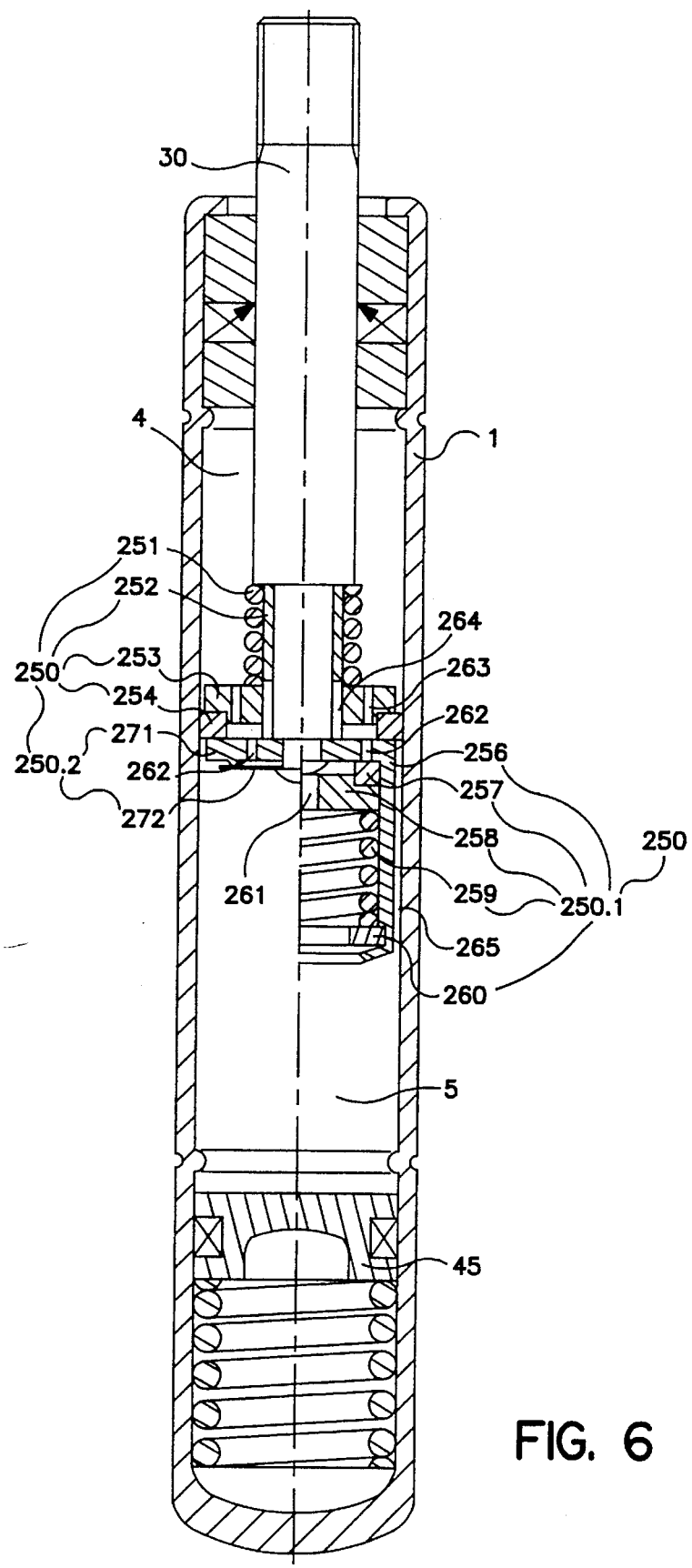

FIG. 6 illustrates an additional embodiment, in which a piston system 250 can be designed in a modular fashion to incorporate additional functions.

A piston system 250 with the subgroups 250.1 or 250.2, depending on the principle of operation employed, can be located on the piston rod 30. When the subgroup 250.1 is used, after an initially high blocking force is overcome, only a slight adjustment force can typically be necessary to make adjustments in both directions. If the piston system 250 is realized with the subgroup 250.2, a high blocking force and later a low adjustment force can essentially be achieved only in the compression direction of the piston rod 30. In the decompression direction, depending on the realization of the valve plate 272, a different blocking force can be achieved, which blocking force can also preferably remain constant when the piston rod 30 is in motion.

If a load is exerted on the piston rod 30 in the decompression direction, a pressure can build up in the working chamber 4. This pressure can be exerted, with the subgroup 250.1, via the flow channels 263, 264 and 262 with the subgroup 250.1 on the sealing element 257, and with the subgroup 250.2 on the valve plate 272.

With the subgroup 250.2, at a certain pressure, the valve plate 272 is raised from the sealing seat of the piston 271, which allows the working fluid to flow from the working chamber 4 into the working chamber 5.

With the subgroup 250.1, the sealing element 257 can preferably be pushed against, and can be supported by the prestress element 259, which prestress element 259 can preferably be supported by means of the plate 260 on the piston 256. This piston 256 can preferably be permanently connected to the piston rod 30. If the compression force resulting from the pressure in the working chamber 4 and the effective cross section of the flow passage 262 is greater than the prestress of the prestress element 259, the passage 262 can essentially be opened to allow fluid flow therethrough from chamber 4 and into chamber 5.

In this case, once the seal 257 is displaced against the prestressing element 259, the pressure in the working chamber 4 acts essentially on the entire surface of the support plate 258. The working fluid can then flow from the working chamber 4 into the working chamber 5 through the nozzle 261, so that the high blocking pressure in the working chamber 4 can be reduced to a low dynamic pressure. This low dynamic pressure should still be sufficient to displace the support plate 258 or the sealing element 257 securely against the prestress element 259.

If the movement of the piston rod 30 is stopped, a pressure equalization can take place in the working chamber 4 and in the working chamber 5, so that in the subgroup 250.1, the sealing element 257 can be pushed back into its sealing position on the piston 256. In the subgroup 250.2, the valve plate 272 would preferably be pushed back in contact with the sealing seat of the piston 271. Consequently, the arresting device can be blocked in place.

If a force is exerted on the piston rod 30 in the compression direction, a pressure can build up in the working chamber 5. This pressure can be exerted via the flow passage 265 on the sealing element 254. If the pressure force on the sealing element 254 becomes sufficient to overcome the prestress of the prestress element 251, essentially the same sequence of operations can occur as occur in the decompression direction. In other words, the sealing element 254, along with the seal plate 253 can be displaced against the force of the prestressing member 251, to thereby enable fluid flow into chamber 4 via passage 263. The passage 264, formed by the sleeve 252 would preferably be closed by the displaced plate 253 in this direction of flow.

Simultaneously, in the valve group 250.2, the valve plate 272 can be pressed firmly onto the seal seat of the piston 271, and, in the valve group 250.1, the sealing element 257 can close the flow hole 262. Depending on the function required, the individual functions can be achieved by employing the modular principle, wherein the end of the piston 30 can alternately hold the arrangement 250.1 or the arrangement 250.2.

Figure 7:
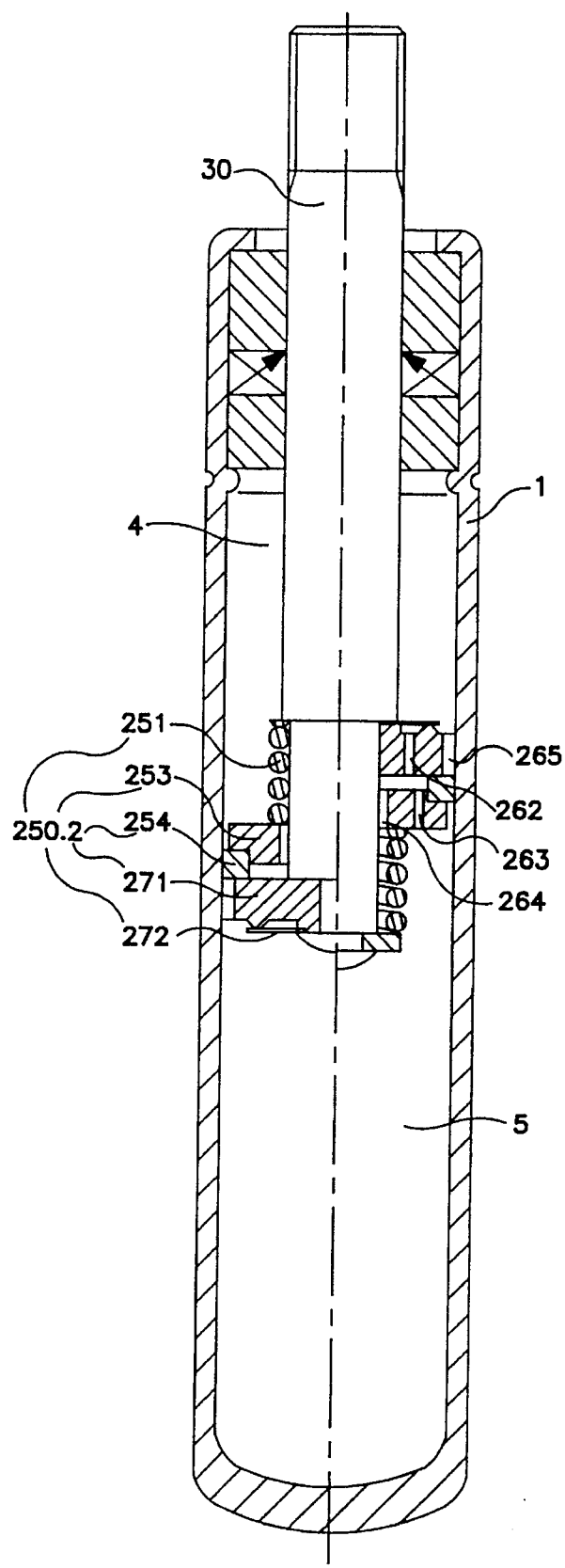
Figure 8:
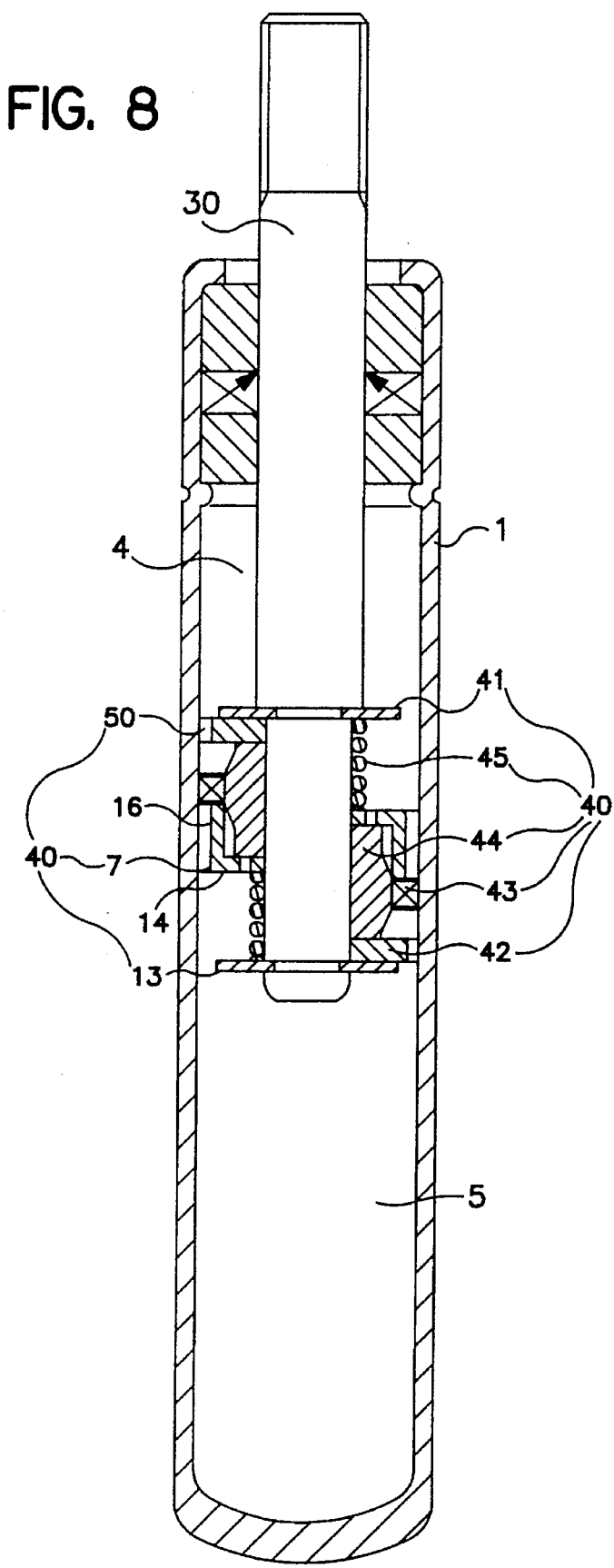

FIGS. 7 and 8 illustrate structurally simple embodiments of the piston/valve systems as have been previously described. These embodiments of FIGS. 7 and 8 essentially provide arresting devices having a blocking function in only one direction, for applications in which two-direction blocking is not necessary. As shown, by using essentially only half of piston/valve system, it can be possible to achieve a blocking function only for only one direction of motion, which function can be realized easily and economically by essentially eliminating the valve systems 60 or 120 in FIGS. 2 or 3 respectively. Depending on the direction of motion, a piston valve system 250.2 (FIG. 7) or 40 (FIG. 8) can be configured so that a blocking can be realized in the insertion or extraction direction, whereby an almost free passage of fluid can essentially be available in the other direction, thereby making blocking in the other direction almost impossible.

In both of FIGS. 7 and 8, the parts depicted are essentially similar to, and function in essentially the same manner as the embodiments depicted in FIGS. 2 and 6.

As shown in FIG. 7, wherein the left and right halves of the drawing show arrangements for blocking in the compression, or decompression operations, respectively, this minimized blocking can preferably be made possible by a very soft spring plate 272. In FIG. 8, similarly depicting left and right halves of the drawing for decompression and compression, respectively, the minimized blocking can preferably be provided by slightly pushing the sealing element 43 out of the sealing position.

Figure 9:
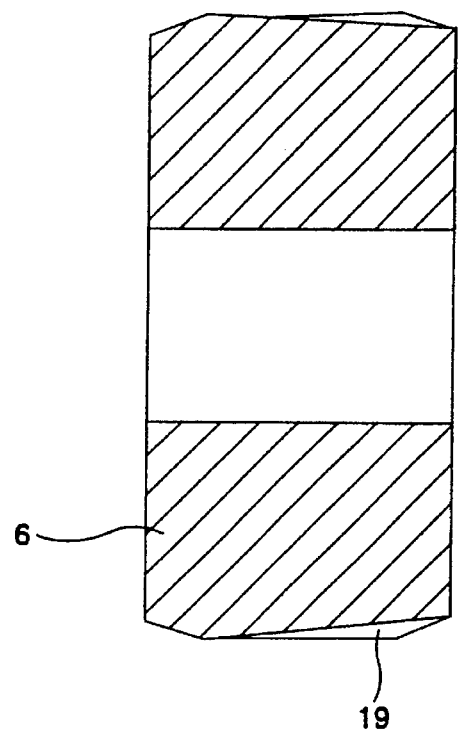
FIGS. 9 and 9a show a piston with wedge-shaped grooves which run axially.

FIG. 9 shows a detail of a piston 6. In the depicted piston 6, there are preferably wedge-shaped grooves 19 which run axially on the outside circumferential surface thereof. When such grooves 19 are used, a particularly smooth pressure equalization between the blocking pressure and the dynamic pressure can be achieved, so that no unpleasant switching noises are generated during usage of the arresting device. The piston 6 illustrated in FIG. 9 is essentially designed for a one-sided system.

Figure 9A:
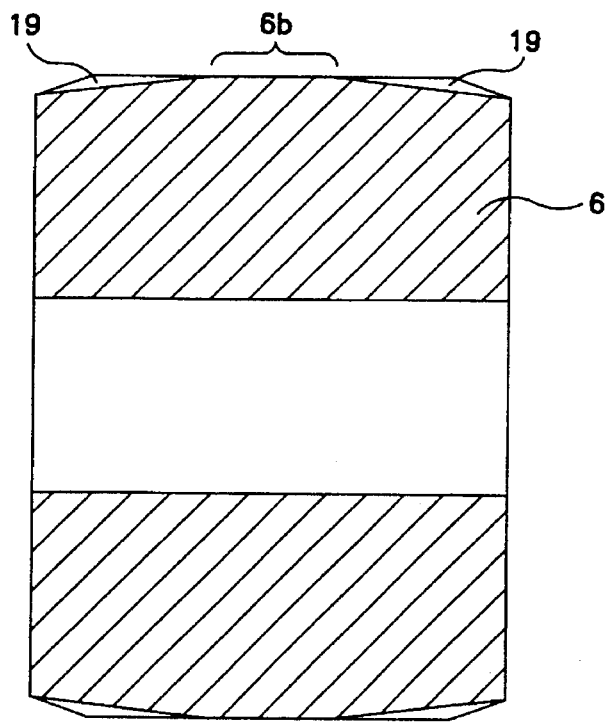

For a system which must act in both directions of movement, the grooves 19 must be extended in symmetrical fashion. But embodiments are also conceivable in which the grooves 19 for both directions of movement run in other than a symmetrical fashion. FIG. 9a depicts a piston 6 having grooves 19 at each end thereof for use in blocking in both movements of direction. As is also depicted in FIG. 9a, if the piston 6 is to be used for both blocking in both direction of movement, a sealing surface 6b can preferably be provided between the grooves 19 at each of the piston ends. This sealing surface 6b can preferably be used for sealing with a sealing ring 9 as shown in FIG. 1a.

Figure 10:
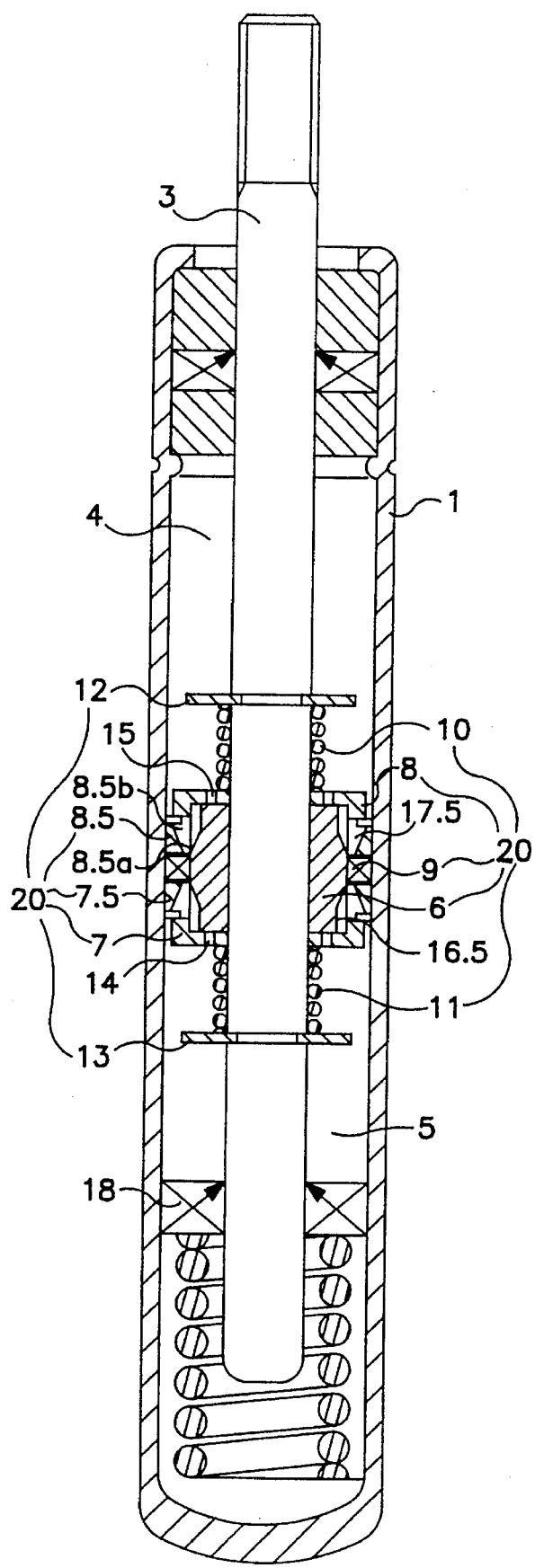
FIG. 10 shows an embodiment in which the movable parts have axial grooves.

FIG. 10 shows an additional embodiment, having similar components as are depicted in the embodiment of FIG. 1a, but in which the piston system 20 has movable parts 7.5 and 8.5 forming portions of the parts 7 and 8 respectively. These movable parts 7.5 and 8.5 can preferably be provided with partial grooves 16.5 and 17.5 respectively, which preferably run axially. In this embodiment, when the valve opens, i.e. when the sealing element 9 is pushed to either side, the movable parts 7.5 and 8.5 with partial axial grooves 16.5 and 17.5 on the inside diameter, are pushed away from the sealing element 9, so that the entire sealing cross section is not released immediately, but only a small flow cross section which is then continuously enlarged. Consequently, a very smooth pressure equalization between the blocking pressure and the dynamic pressure is achieved, so that there are no unpleasant switching noises generated when the sealing element 9 comes into contact with the movable parts 7.5 or 8.5 or as a result of sudden changes in pressure.

In other words, if for example, the sealing element 9 is being displaced downwardly due to an increase in pressure in chamber 4, when the sealing element 9 is displaced out of sealing engagement with the piston 6, only a small flow cross-section 8.5a would at first be available for flow of fluid between the piston 6 and the cylinder 1. Then, after a further displacement of the sealing element 9 and part 8.5 downwardly, the flow cross-section would essentially continuously be increased towards 8.5b. Thus, instead of an immediate opening of the entire width of the flow cross-section between the piston 6 and the cylinder 1, there would instead be only a gradual opening.

Figure 11:
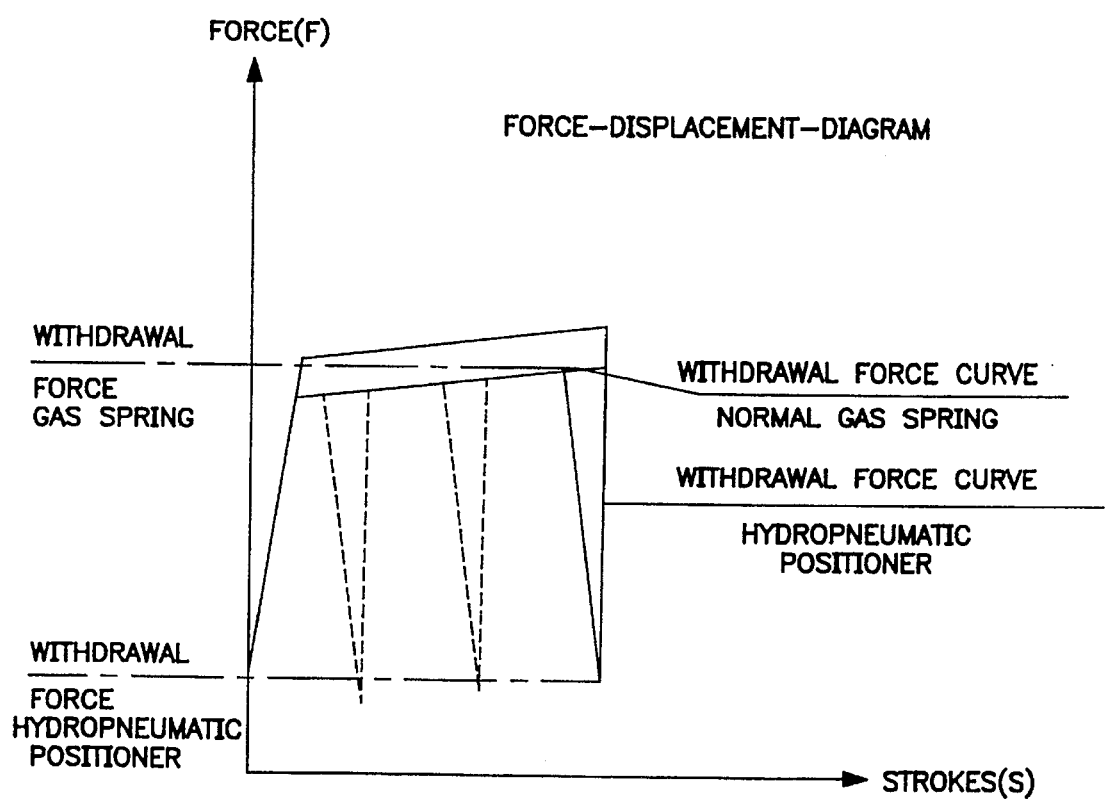
FIG. 11 is a force-displacement diagram.

FIG. 11 shows a force-displacement diagram for a gas-assisted, hydropneumatic arresting device. Such an arresting device, by means of the partial blocking of the piston rod, makes possible a reduction of the force required to overcome the arresting device. If the device were used for a trunk lid of a motor vehicle, that would mean that, during a closing of the trunk lid, a reduced load would be exerted on the articulations. Thus, such an arresting device could also be used in flexible hinges or, in this respect, frames.

FIG. 12 shows an additional embodiment of an arresting device in which there is once again a chamber, located in a hollow cylinder 1, filled with a working fluid and sealed externally. This chamber can essentially be divided by a piston system 80 into two separate working chambers 4 and 5. The piston system 80 can preferably be connected to a piston rod 3 which extends outside of the cylinder 1. The piston system 80 is illustrated in greater detail in various positions in FIGS. 12a and 12b.

The lower half of FIG. 12a shows the arresting device in the blocked position. In the blocked position, the piston 6c separates the working chambers 4 and 5 from one another by means of the part 8a and the sealing element 9a. The axially movable part 8a can preferably be pressurized by means of a prestress element 11a, positioned by a positioning element 82, shown in FIG. 12a. During the extraction of the piston rod 3, the pressure in the working chamber 4 can increase, and the pressure force can act on the piston 6c and the sealing element 9a, as illustrated in the upper half of FIG. 12a. If the pressure force on the piston 6c and on the sealing element 9a and the axially movable part 8a increases, resulting from the pressure and the hydraulic cross section surface of the sealing element 9a, and if the pressure becomes greater than the prestress force of the prestress element 11a, the sealing element 9a and the part 8a can be displaced against the force of the prestress element 11a. Fluid can then flow from chamber 4, via passages 85 and 86 and into chamber 5. Consequently, the sealing element 9a can be pushed out of its sealing position, so that the piston-rod-side pressure of chamber 4 is no longer exerted on the small hydraulic cross section of the sealing element 9a, but on a larger hydraulic cross section of the entire axially movable part 8a, thereby reducing the dynamic pressure.

To prevent switching noises caused by a sudden opening of the part 8a, as a result of the change in the cross section, there can preferably be a wedge-shaped groove 19 in the piston 6c. As discussed earlier, this wedge-shaped groove 19 can make possible a smooth opening. As a result of the larger hydraulic diameter of the part 8a, the dynamic pressure required to keep the part 8a open is lower than the initial pressure on sealing element 9a required to move the sealing element 9a.

As shown in the upper portion of FIG. 12b, the part 8a can essentially be displaced axially towards the positioning member 82, wherein a damper element 81 can preferably be disposed about the shaft 83 to dampen the movement in the axial direction. This damping element can preferably be elastomeric, and can also serve to minimize a contact noise between the part 8a and the positioning member 82.

When movement of the piston rod 3 is stopped, the pressure within the chambers 4 and 5 can become equalized, and the force of the prestressing element 11a can push the part 8a and sealing element 9a back into a sealing position to again separate the chamber 4 and 5.

When the piston rod 3 is inserted, so that the pressure in chamber 5 increases, in this embodiment, the sealing element 9a can be pushed out of its sealing position and toward another positioning member 84, as shown in the lower half of FIG. 12b. Fluid can then flow from the chamber 5, back into the chamber 4. It can then be possible to insert the piston rod 3 back into the cylinder 1, since there is a corresponding cross section for the equalization of the working fluid.

Figure 13:
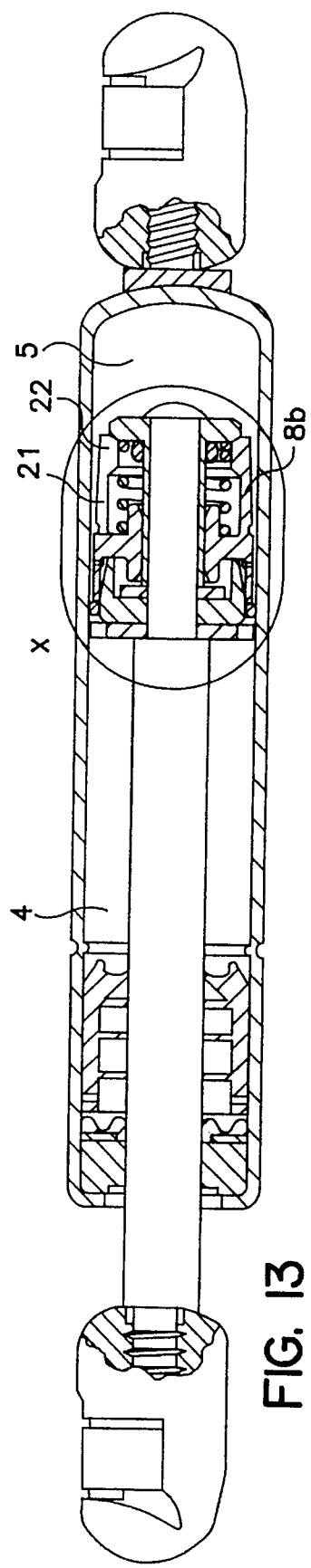
FIGS. 13, 13a and 13b illustrate still another additional embodiment of an arresting device.
Figure 13B:
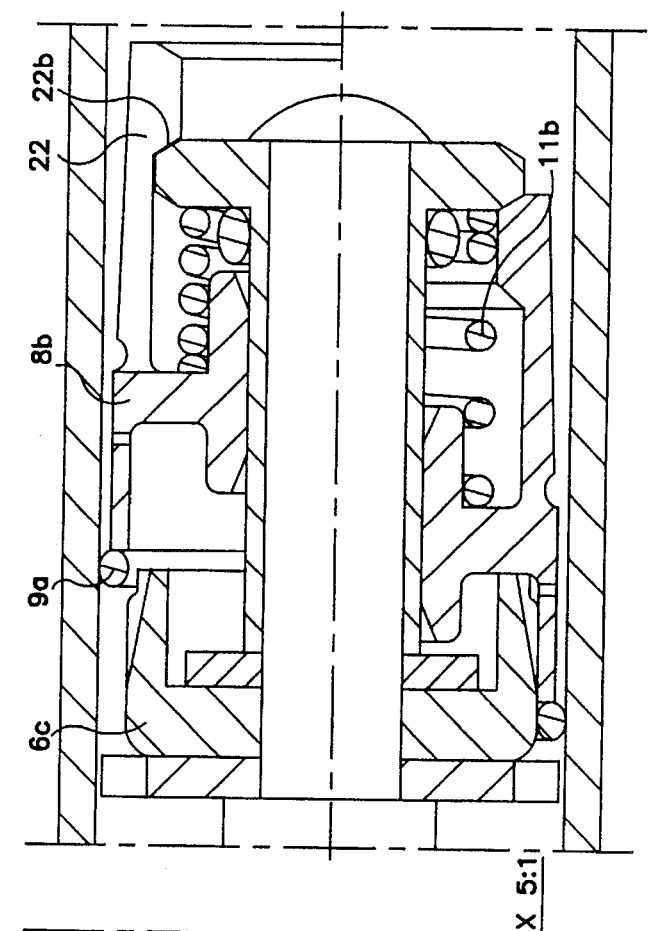
Figure 13A:
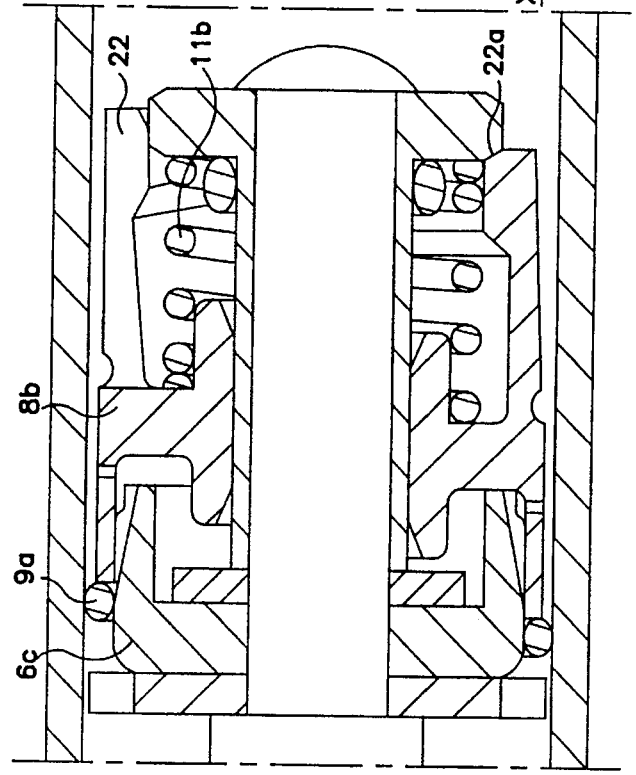

FIG. 13 is a schematic diagram of an arresting device similar to the one illustrated in FIG. 12, with the difference that the axially movable part 8b is provided with an arresting element 21. This arresting element 21 can be provided to help hold the part 8b in the open position. FIG. 13a and 13b, similar to the illustrations of FIGS. 12a and 12b, show the individual positions of the piston 6c, and the axially movable part 8b, together with the sealing element 9a. On account of the mechanical arresting element 21, it can be possible, on one hand, to achieve a high blocking force in the arrested position, and on the other hand, to achieve a low return force of the axially movable part 8b, and thus a relatively low dynamic pressure.

This high blocking and low dynamic pressure can be achieved because the part 8b, which fixes the sealing element 9a in the arresting position, can additionally be supported by an interlocking snap mechanism 22 at the adjoining surfaces 22a. Thus, in order to displace the part 8a the fluid pressure must also overcome the engagement at surfaces 22a in addition to the pressure of the prestressing element 11b. When there is sufficient pressure to displace the part 8b, the piston-rod-side blocking pressure can push the part 8b against the force of the prestressing element 11b, and the snap elements 22 can flex radially, and then, only the prestressing force of the compression spring 11b needs to be overcome to further displace the part 8b. Also, when part 8b is in the open position (upper half of FIG. 13b), the arresting element 22 snaps radially inwardly, so that there can be an interlock at the surfaces 22b. Thus, the part 8b can be at least partially retained in its open position by the interlock at surfaces 22b. The closing spring force of prestressing element 11b can thus be at least partly offset. Consequently, only a slight dynamic pressure can be necessary to maintain the flow connection open, since it can no longer be necessary to overcome the entire prestressing force of the spring, but only a prestressing force which has been reduced by the retaining force of the arresting element 22.

With an absolute pressure equalization between the working chambers 4 and 5, if for example the piston rod has come to a stop, the return force of the coil compression spring can prevail so that the part 8b can be pushed out of the arresting position, and thus the flow connection between working chambers 4 and 5 can be closed.

Figure 14:
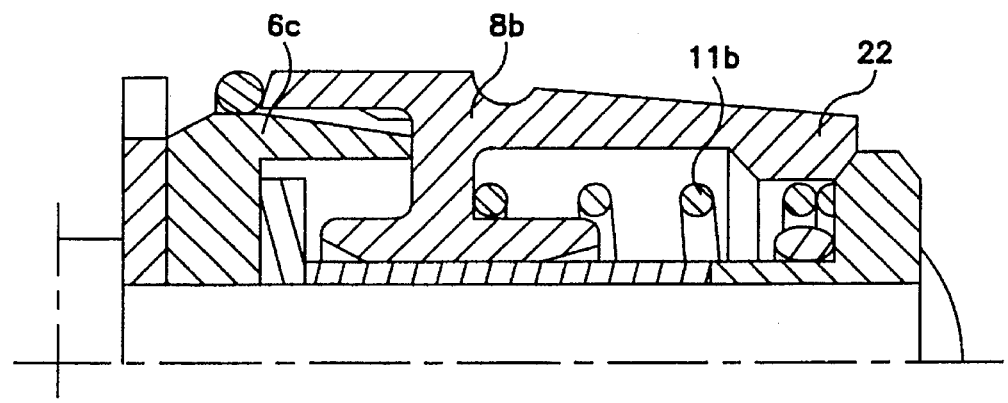
FIGS. 14–16 depict embodiments of an additional arresting mechanism of an arresting device.

FIG. 14 shows a detail of a piston 6c in which the axially movable part 8b is provided with a snap element 22, which is the same as the one illustrated in FIGS. 13, 13a and 13b.

Figure 15:
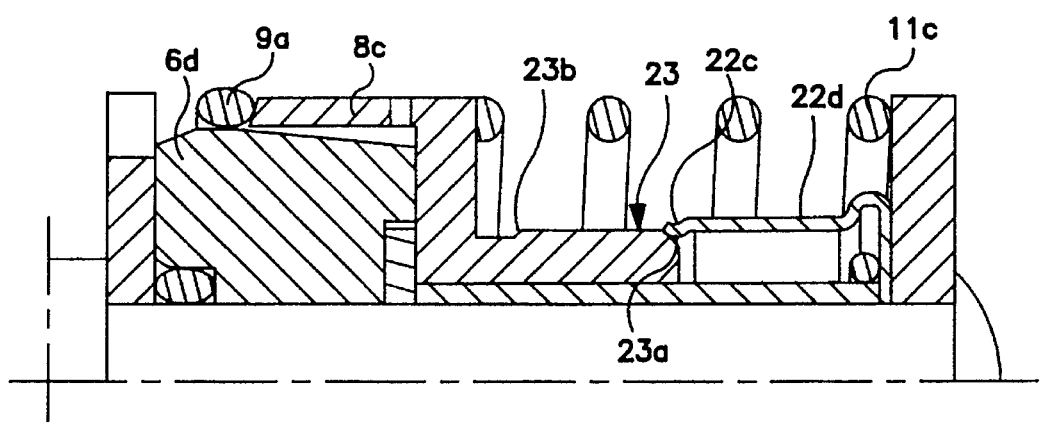

FIG. 15 illustrates an additional embodiment of an arresting device, in which there is a spring clip 22d corresponding to the piston 6d, the sealing element 9a and the axially movable part 8c. The spring clip 22d can preferably have a clasp portion 22c. When the part 8c is displaced, the spring clip 22d can be pushed onto the cylindrical external surface 23 of the part 8c, thereby forming an arresting element by an engagement between surfaces 23b and clasp 22c. Thus, to open the flow connection, a blocking at surfaces 23a would need to be overcome in addition to the blocking by the prestressing element 11c, and for the closing of the flow connection, the engagement of clasp 22c at surface 23b would need to be overcome.

Figure 16:
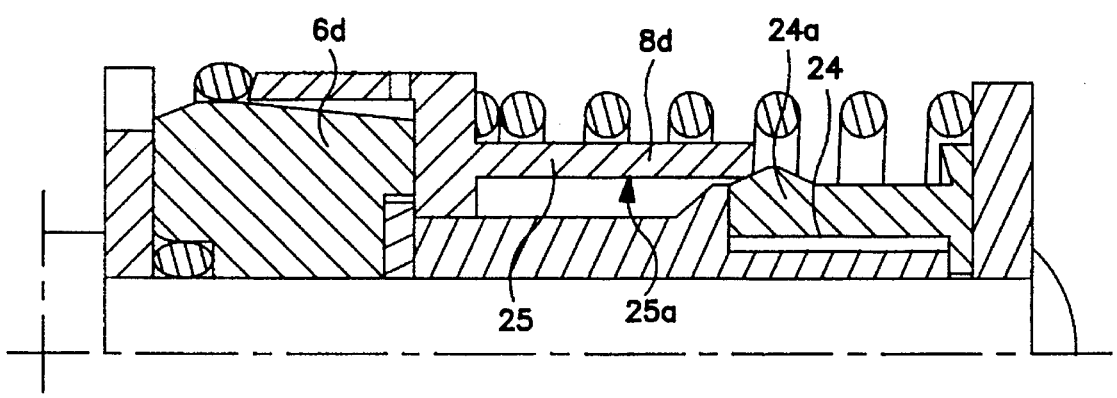

FIG. 16 shows a piston 6d, in which the axially-movable part 8d has a cylindrical sleeve 25, with an interior sleeve surface 25a. In this embodiment, the piston 3 can be provided with a friction element 24 which fits with the cylindrical sleeve 25 and forms a friction connection by means of the cylindrical inside surface 25a and a projecting portion 24a of the friction element 24. Here again, an arresting element is formed essentially be means of friction, which friction would need to be overcome to both open and close the flow connection.

One feature of the invention resides broadly in the arresting device for arresting in different positions two movable objects which are movable in relation to one another, with a hollow cylinder connected to one of the objects and a movable piston in the hollow cylinder, which piston is connected to the other object by means of a piston rod which runs out of the hollow cylinder, whereby the piston of the externally-closed hollow cylinder is divided into two working chambers of variable volumes containing a working fluid and/or a gas, whereby the flow connection between the two working chambers is possible at least partly by means of an exchange device in the piston, characterized by the fact that the exchange device consists of at least two parts which can be moved relative to one another, whereby the flow connection is opened after displacement from a base position assumed in the rest position.

Another feature of the invention resides broadly in the arresting device characterized by the fact that the piston is designed in two parts as the exchange device.

Yet another feature of the invention resides broadly in the arresting device characterized by the fact that the piston is divided into a radially outer part and a radially inner part, whereby the two parts can be displaced relative to one another in the axial direction.

Still another feature of the invention resides broadly in the arresting device characterized by the fact that the radially inner part is held in a sealed manner on the piston rod, and that the radially outer part is mounted in a sealed manner with respect to the hollow cylinder.

A further feature of the invention resides broadly in the arresting device characterized by the fact that the exchange device has a part which is held stationary and one movable part each for the decompression and compression directions.

Another feature of the invention resides broadly in the arresting device characterized by the fact that at least one of the parts which can be moved in relation to the other part is flexibly supported.

Yet another feature of the invention resides broadly in the arresting device characterized by the fact that the flow connection is formed by the facing surfaces of the parts, such that at least one of the surfaces has a conical curve.

Still another feature of the invention resides broadly in the arresting device characterized by the fact that the flow connection is formed by the facing surfaces of the parts, such that a wedge-shaped groove which runs in an axial fashion is located in at least one of the surfaces.

A further feature of the invention resides broadly in the arresting device characterized by the fact that the flow connection is located in one of the parts in a recess which runs at an angle to the longitudinal axis, whereby there are blocking means located in the neighboring part.

Another feature of the invention resides broadly in the arresting device characterized by the fact that the parts which can move relative to one another are located axially one behind the other.

Yet another feature of the invention resides broadly in the arresting device characterized by the fact that the piston ring enclosed between the parts is designed as a blocking means for the flow connection.

Still another feature of the invention resides broadly in the arresting device characterized by the fact that the flow connection is provided with a throttle valve.

A further feature of the invention resides broadly in the arresting device characterized by the fact that there is a spring-loaded and/or gas-filled equalization chamber in the hollow cylinder.

Another feature of the invention resides broadly in the arresting device characterized by the fact that the piston rod runs through both working chambers.

Yet another feature of the invention resides broadly in the arresting device characterized by the fact that in the hollow cylinder, an additional fluid-filled chamber is formed by means of a partition, whereby the exchange device is located in the piston and/or in the partition.

Still another feature of the invention resides broadly in the arresting device characterized by the fact that at least one of the axially-movable parts is provided with an arresting element.

A further feature of the invention resides broadly in the arresting device characterized by the fact that the arresting element is a snap element, a spring element and/or a friction element.

Some additional types of positioning devices and components thereof which might be usable in conjunction with the positioning devices as described hereinabove might be disclosed by the following U.S. Patents: U.S. Pat. No. 4,0999,602 to Kourbetsos, issued in July 1978; U.S. Pat. No. 3,236,515 to Ackerman, issued in February 1966; U.S. Pat. No. 3,228,632 to Hunth, issued in January 1966; and U.S. Pat. No. 5,275,386 to Schnitzius et al., issued in January 1994.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application Nos. P 44 31 626.7, filed on Sep. 6, 1994 and P 43 39 448.5, filed on Nov. 19, 1994, having inventors Klaus Koch and Heinz-Josef Heinrichs, and DE-OS P 44 31 626.7 and P 43 39 448.5, and DE-PS P 44 31 626.7 and P 43 39 448.5, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydraulic strut for positioning a first object and a second object relative to one another, said hydraulic strut having a rest configuration, said hydraulic strut comprising:

a cylinder, the cylinder having a first axial end and a second axial end, and the cylinder defining a chamber therein, the chamber having at least first and second chamber portions;

means for connecting said cylinder to the first object;

piston means disposed within said cylinder, said piston means separating the first and second chamber portions of said chamber, said first chamber portion being disposed adjacent said first axial end of said cylinder and said second chamber portion being disposed adjacent said second axial end of said cylinder;

piston rod means, said piston rod means having a first end adjacent said piston means, and a second end extending from said piston means out of said first end of said cylinder;

means for connecting said second end of said piston rod means to the second object;

hydraulic fluid disposed within said first and second chamber portions;

said piston means comprising flow passage means fluidly connecting said first and second chamber portions, said flow passage means comprising at least a first flow passage portion connecting said first and second chamber portions;

said piston means comprising at least first and second valve portions, said first and second valve portions having a base configuration for closing said at least a first flow passage portion, and an open configuration for opening said at least a first flow passage portion;

means for retaining said first and second valve portions in said base configuration in said rest configuration of said strut, said means for retaining comprising means for applying a first force to at least one of said first and second valve portions to retain said first and second valve portions in said base configuration;

at least one of said first and second valve portions being movable from said base configuration with respect to the other of said first and second valve portions against said first force to open said at least one flow passage portion upon movement of said piston rod means within said cylinder, the movement of the piston rod means within the cylinder increasing a hydraulic pressure in said second chamber portion upon movement of said piston rod means into said cylinder and increasing a hydraulic pressure in said first chamber portion upon movement of said piston rod means out of said cylinder, and said at least one of said first and second valve portions being movable out of the base configuration upon the force exerted by the hydraulic pressure becoming greater than said first force;

at least one of said first and second valve portions having a surface movable between said base configuration and said open configuration; and means for exposing a first cross sectional area of said movable surface to the hydraulic fluid pressure in one of said first and second chamber portions when said at least one of said first and second valve portions is in said base configuration, and for exposing a second cross sectional area of said movable surface to the hydraulic fluid pressure in said one of said first and second chamber portions when said at least one of said first and second valve portions is in said open configuration;

said second cross sectional area being substantially greater than said first cross sectional area.

2. The strut according to claim 1, wherein:

said piston means comprises first and second piston parts;

said first piston part comprises said first valve portion and said second piston part comprises said second valve portion;

said first piston part comprises a radially inner piston part and said second piston part comprises a radially outer piston part disposed radially outwardly of at least a portion of said radially inner piston part; and at least one of said first and second piston parts is displaceable axially within said cylinder with respect to the other of said first and second piston parts to open and close said at least a first flow passage portion.

3. The strut according to claim 2, wherein:

said piston rod means is insertable into said cylinder in a first axial direction to increase hydraulic pressure in said second chamber portion and force fluid under pressure from said second chamber portion through said flow passage means and into said first chamber portion;

said piston rod means is withdrawable out of said cylinder in a second axial direction opposite to said first axial direction to increase hydraulic pressure in said first chamber portion and force fluid under pressure from said first chamber portion through said flow passage means and into said second chamber portion;

said base configuration of said first and second piston parts blocks at least one of:

flow of fluid from said second chamber portion to said first chamber portion; and flow of fluid from said first chamber portion to said second chamber portion;

said first piston part comprises an annular member disposed about said piston rod means, and said first piston part comprises means for sealing with said piston rod means, said first piston part defines an annular passage disposed about said first piston part between said first piston part and said cylinder, at least a portion of said annular passage comprises said first flow passage portion;

said second piston part comprises an annular member disposed adjacent said first piston part for blocking said annular passage, said second piston part comprises means for sealing with said cylinder and means for sealing with said first piston part; and said first and second piston parts comprise means for controlling flow of fluid through said at least a first flow passage portion during at least one of:

insertion of said piston rod means into said cylinder, and withdrawal of said piston rod means out of said cylinder.

4. The strut according to claim 3, wherein:

said flow passage additionally comprises a second flow passage portion connecting said first and second chamber portions;

said strut comprises third and fourth valve parts, said third valve part comprises a radially inner valve part and said fourth valve part comprises a radially outer valve part disposed about at least a portion of said radially inner valve part;

said third and fourth valve parts have a base configuration for closing said second flow passage portion, and an open configuration for opening said second flow passage portion;

said strut comprises means for retaining said third and fourth valve parts in said base configuration in said rest configuration of said strut, said means for retaining comprising means for applying a second force to at least one of said third and fourth valve parts to retain said third and fourth valve parts in said base configuration;

at least one of said third and fourth valve parts is displaceable axially within said cylinder with respect to the other of said third and fourth valve parts to open said second flow passage portion upon hydraulic pressure becoming greater than said second force and close said second flow passage portion upon hydraulic pressure becoming less than said second force;

said cylinder further comprises partition means disposed within said cylinder between said piston means and said second end of said cylinder, said partition means dividing said second chamber portion into a first chamber part between said partition means and said piston means and a second chamber part between said partition and said second end of said cylinder;

said partition means comprises said third and fourth valve parts;

said third valve part is disposed about said partition means, and said third valve part comprises means for sealing with said partition means, said third valve part defines an annular passage between said third valve part and said cylinder, at least a portion of said annular passage comprises said second flow passage portion;

said fourth valve part comprises means for sealing with said cylinder and means for sealing with said third valve part to block said second flow passage portion; and said first and second piston parts comprise means for controlling flow of fluid through said flow passage through said first flow passage portion during one of:
insertion of said piston rod means into said cylinder, and
withdrawal of said piston rod means out of said cylinder; and said third and fourth valve parts comprise means for controlling flow of fluid through said flow passage through said second flow passage portion during the other of:
insertion of said piston rod means into said cylinder, and
withdrawal of said piston rod means out of said cylinder.

5. The strut according to claim 4, wherein:

said second piston part is displaceable relative to said first piston part;

said fourth valve part is displaceable relative to said third valve part;

said means for retaining said first and second valve portions in said base configuration comprises first biasing means for biasing said second piston part into said base configuration to seal said first flow passage portion; and said means for retaining said third and fourth valve parts in said base configuration comprises second biasing means for biasing said fourth valve part into said base configuration to seal said second flow passage portion.

6. The strut according to claim 5, wherein:

said first and second biasing means each apply a biasing force to the respective ones of said second piston part and said fourth valve part;

said strut comprises a strut for positioning and maintaining positioning of the first and second objects with respect to one another at essentially any relative positioning between said piston rod means and said cylinder when an axial force between said piston rod means and said cylinder is less than the biasing force of a respective one of said first and second biasing means;

said first biasing means comprises:
a first cup-shaped element disposed about said piston rod means, said first cup-shaped element comprises a first cylindrical end disposed towards said second piston part, and a base plate from which said cylindrical part extends; and
a first spring member disposed about said piston rod means to bias said first cylindrical end of said first cup-shaped element into engagement with said second piston part;

said second biasing means comprises:
a second cup-shaped element disposed about said partition means, said second cup-shaped element comprises a first cylindrical end disposed towards said fourth valve part, and a base plate from which said cylindrical part extends; and
a second spring member disposed about said partition means to bias said first cylindrical end of said second cup-shaped element into engagement with said fourth valve part;

said first piston part and said third valve part each comprise a surface disposed radially outwardly;

said second piston part and said fourth valve part each comprise a surface disposed radially inwardly for sealing with said radially outwardly disposed surface of a respective one of said first and third piston parts in said base configuration;

at least one of: said radially outwardly disposed surface of said first piston part, and said radially inwardly disposed surface of said second piston part, and at least one of: said radially outwardly disposed surface of said third valve part, and said radially inwardly disposed surfaces of said fourth valve part each comprises one of:
a conical contour in an axial direction; and
a wedge-shaped groove which runs in an axial direction, to provide said first flow passage portion between said first piston part and said second piston part, and said second flow passage portion between said third valve part and said fourth valve part upon axial displacement of said second piston part and said fourth valve part along said at least one of:
said conical contour; and
said wedge-shaped groove.

7. The strut according to claim 6, wherein:

said cylinder further comprises a second piston disposed between said partition means and said second end of said cylinder, said second piston having a first side disposed towards said partition means and a second side disposed towards said second end of said cylinder, said second chamber being disposed adjacent said first side of said second piston, and said second piston defining a third chamber portion disposed at said second end of said cylinder; and said third chamber portion comprises at least one of:
a spring member for biasing said second piston towards said partition means, and
gas under pressure for biasing said second piston towards said partition means, for equalizing fluid volume within the cylinder;

said partition means is one of:
disposed on said piston rod means; and
affixed in place within said cylinder; said piston rod means comprises:
a first disc-shaped member disposed thereabout and axially braced against movement on said piston rod means, said first disc-shaped member having a first side disposed towards said second end of said piston rod means and a second side disposed towards said first end of said piston rod means;

said first piston part being disposed adjacent said second side of said disc-shaped member, said first piston part having a first end disposed towards said first disc-shaped member, a second end disposed away from said first disc-shaped member, and said radially outwardly disposed surface for sealing with said second piston part being disposed between said first and second ends, said first passage portion widening in a direction from said radially outwardly disposed surface for sealing with said second piston part towards said first and second ends of said first piston part, said second piston part being disposed radially about said first piston part adjacent said radially outwardly disposed surface for sealing, in said rest configuration with said first passage portion closed;

said first spring member being disposed adjacent said second end of said first piston part; and said first cup-shaped element disposed between said first spring member and said first piston part with said first cylindrical end thereof extending about at least a portion of said first piston part and contacting said second piston part, said first cup-shaped element being biased towards said first piston part to position said second piston part adjacent said radially outwardly disposed surface for sealing of said first piston part to close said first passage portion; and said partition means comprises:
said third valve part fixedly disposed on one of:
said piston rod means; and
said cylinder means;

said third valve part having a first end disposed towards said piston means, a second end disposed opposite said first end, and said radially outward surface for sealing with said fourth valve part being disposed between said first and second ends, said second passage portion widening in a direction from said radially outwardly disposed surface for sealing towards said second end of said third valve part, said fourth valve part being disposed radially about said third valve part adjacent said radially outwardly disposed surface for sealing in said rest configuration with said second passage portion closed;

said second spring member being disposed adjacent said second end of said third valve part; and said second cup-shaped element being disposed between said second spring member and said third valve part with said first cylindrical end thereof extending about at least a portion of said third valve part, said second cup-shaped element being biased towards said third valve part to position said fourth valve part adjacent said radially outwardly disposed surface for sealing to close said second passage portion.

8. A hydraulic strut for positioning a first object with respect to a second object, said strut having a rest configuration for maintaining a selected position of the first object with respect to the second object, said strut comprising:

a cylinder, the cylinder having a first axial end and a second axial end;

means for connecting said cylinder to one of:
a) the first object, and
b) the second object;

piston means disposed within said cylinder, said piston means dividing said cylinder into first and second chamber portions, said first chamber portion being disposed adjacent said first end of said cylinder and said second chamber portion being disposed adjacent said second end of said cylinder;

piston rod means, said piston rod means having a first end connected with said piston means, and a second end extending from said piston means out of said first end of said cylinder;

means for connecting said second end of said piston rod means to the other of:
a) the first object, and
b) the second object;

said piston means comprising flow passage means fluidly connecting said first and second chamber portions;

at least one first and at least one second valve portion, said first and second valve portions having a base configuration for closing said flow passage means, said first and second valve portions being in said base configuration in said rest configuration of said strut;

means for relatively biasing at least one of said first and second valve portions with respect to the other of said first and second valve portions to position said first and second valve portions in said base configuration, said means for biasing comprising means for applying a biasing force to said at least one of said first and second valve portions;

said at least one of said first and second valve portions being movable against said biasing force from said base configuration with respect to the other of said first and second valve portions to open said flow passage upon movement of said piston rod means within said cylinder, the movement of the piston rod means within the cylinder increasing hydraulic pressure in one of said first and second chamber portions, and said at least one of said first and second valve portions being movable against said biasing force by the increased hydraulic pressure;

at least one of said first and second valve portions having a surface movable between said base configuration and said open configuration; and means for exposing a first cross sectional area of said movable surface to the hydraulic fluid pressure in one of said first and second chamber portions when said at least one of said first and second valve portions is in said base configuration, and for exposing a second cross sectional area of said movable surface to the hydraulic fluid pressure in said one of said first and second chamber portions when said at least one of said first and second valve portions is in said open configuration;

said second cross sectional area being substantially greater than said first cross sectional area.

9. The strut according to claim 8, wherein:
said piston means comprises first and second piston parts;
said first piston part comprises said first valve portion and said second piston part comprises said second valve portion;
said first piston part comprises a radially inner piston part and said second piston part comprises a radially outer piston part disposed radially outwardly of at least a portion of said radially inner piston part;
at least one of said first and second piston parts is displaceable, against said biasing force by the increased hydraulic pressure, axially within said cylinder with respect to the other of said first and second piston parts to open and close said flow passage means; and
said movable surface is substantially transverse to an axis of movement of said piston means between said base configuration and said open configuration.

10. The strut according to claim 9, wherein:
said piston rod means is insertable into said cylinder in a first axial direction to increase hydraulic pressure in said second chamber portion and force fluid under pressure from said second chamber portion through said flow passage means and into said first chamber portion;
said piston rod means is withdrawable out of said cylinder in a second axial direction opposite to said first axial direction to increase hydraulic pressure in said first chamber portion and force fluid under pressure from said second chamber portion through said flow passage means and into said first chamber portion;
said first piston part comprises an annular member disposed about said piston rod means, and said first piston part comprises means for sealing with said piston rod means;
said first piston part comprises a surface disposed towards said cylinder, and said flow passage means comprises at least one first fluid passage disposed at said surface, between said surface and said cylinder, for conducting hydraulic fluid between said first and second chamber portions;

said second piston part comprises an annular member disposed radially outwardly of at least a portion of said first piston part, said second piston part comprises means for sealing with said cylinder and means for sealing with said first piston part to block said at least one first fluid passage; and said first and second piston parts comprise means for controlling flow of fluid through said at least one fluid passage during at least one of:

insertion of said piston rod into said cylinder, and withdrawal of said piston rod out of said cylinder.

11. The strut according to claim 10, wherein:

said piston comprises third and fourth piston parts, said third piston part comprises another said first valve portion and said second piston part comprises another said second valve portion;

said third piston part comprises a radially inner piston part and said fourth piston part comprises a radially outer piston part disposed radially outwardly to at least a portion of said radially inner third piston part; and at least one of said third and fourth piston parts is displaceable axially within said cylinder with respect to the other of said third and fourth piston parts to open and close said flow passage;

said third piston part is disposed about said piston rod means, and said third piston part comprises means for sealing with said piston rod means;

said third piston part comprises a surface disposed towards said cylinder, and said flow passage means comprises at least one second fluid passage disposed at said surface, between said surface and said cylinder, for conducting hydraulic fluid between said first and second chamber portions;

said fourth piston part comprises means for sealing with said cylinder and means for sealing with said fourth piston part to block said at least one second fluid passage;

said first and second piston parts comprise means for controlling flow of fluid through said flow passage means during insertion of said piston rod into said cylinder; and said third and fourth piston parts comprise means for controlling flow of fluid through said flow passage means during withdrawal of said piston rod out of said cylinder.

12. The strut according to claim 11, wherein said first and third piston parts are substantially fixed axially with respect to said piston rod means, and said piston means further comprises biasing means for biasing each of said second and fourth piston parts into said base configuration to seal said flow passage means.

13. The strut according to claim 12, wherein:

said strut comprises a strut for positioning and maintaining positioning of the first and second objects with respect to one another;

said piston means is configured as one of (A) and (B):

(A) said first and third piston parts are disposed on said piston rod means at an axial distance from one another, said second and fourth piston parts are disposed axially between said first and third piston parts, with said second piston part axially adjacent said first piston part and said fourth piston part axially adjacent said third piston part and said biasing means comprises:

a first disc-shaped element disposed about said piston rod means axially adjacent said second piston part and a second disc-shaped element disposed about said piston rod means axially adjacent said fourth piston part, said first and second disc-shaped elements comprising a portion for engaging with a respective one of said second and fourth piston parts, a single spring member disposed between said and second disc-shaped elements to axially bias said first and second disc-shaped elements away from one another and into engagement with the respective one of said second and fourth piston parts to bias said second and fourth piston parts into engagement with said first and third piston parts;

(B) said piston means comprises a piston disc, said piston disc having a first side comprising said first piston part and a second side, opposite to said first side, comprising said third piston part, said second piston part being disposed axially adjacent said first piston part at said first side of said piston disc, and said fourth piston part being disposed axially adjacent said third piston part at said second side of said piston disc, and said biasing means comprises:

a first disc-shaped element disposed about said piston rod means and axially adjacent said first side of said piston disc, said first disc-shaped element comprising means for engaging said second piston part, a second disc-shaped element disposed about said piston rod means and axially adjacent said second side of said piston disc, said second disc-shaped element comprising means for engaging said fourth piston part, a first spring member disposed axially adjacent said first disc-shaped element for biasing said first disc-shaped element into engagement with said second piston part to bias said second piston part into engagement with said first side of said piston disc, and a second spring member disposed axially adjacent said second disc-shaped element for biasing said second disc-shaped element into engagement with said fourth piston part to bias said fourth piston part into engagement with said second side of said piston disc;

said first and third piston parts each comprise a cylindrical edge disposed towards said respective one of said second and fourth piston parts;

said second and fourth piston parts each comprise an axial end surface disposed towards said respective one of said first and third piston parts for sealing with said cylindrical edge of said respective one of said first and third piston parts in said base configuration;

said cylinder further comprises a second piston disposed between said piston means and said second end of said cylinder, said second piston defining a third chamber portion disposed at said second end of said cylinder;

said third chamber comprises at least one of:

a spring member for biasing said second piston towards said piston means, and gas under pressure for biasing said second piston towards said piston means, for equalizing fluid volume within the cylinder; and said piston rod means passes through each of said first and second chamber portions into said third chamber.

14. The strut according to claim 9, wherein:

said first piston part comprises said flow passage means therethrough, said flow passage means being disposed substantially axially;

said second piston part comprises a sealing member for blocking said flow passage means; and one of said first and said second piston parts is movable axially towards and away from the other of said first and second piston parts to open and close said flow passage means.

15. The strut according to claim 14, wherein:

said first piston part comprises a cylindrical member disposed on said piston rod means;

said second piston part comprises a piston ring disposed about and adjacent said first piston part;

said piston ring comprises said sealing member for blocking said flow passage means; and said biasing means comprises biasing means for biasing said second piston part towards said said first piston part.

16. The strut according to claim 15, wherein:

said flow passage means comprises a throttle valve;

said strut comprises a strut for positioning and maintaining positioning of the first and second objects with respect to one another;

said biasing means comprises a spring member disposed about said piston rod means to bias said second piston part towards said first piston part to block said flow passage means with said sealing element;

said cylinder further comprises a second piston disposed between said piston means and said second end of said cylinder, said second piston defining a third chamber portion disposed at said second end of said cylinder;

said third chamber comprises at least one of:
  a spring member for biasing said second piston towards said piston means, and
  gas under pressure for biasing said second piston towards said piston means,
for equalizing fluid volume within the cylinder;

said piston rod means passes through each of said first and second chamber portions into said third chamber;

said second piston part additionally comprises an arresting element for holding said second piston part away from said first piston part to maintain said flow passage open; and said arresting element comprises at least one of:
a snap element, a spring element and a friction element.

17. A device for positioning two objects, movable in relation to one another, and maintaining a position of the two objects with respect to one another, said device comprising:

a cylinder, the cylinder having a first axial end and a second axial end;

means for connecting said cylinder to one of the two objects;

piston means disposed within said cylinder, said piston means dividing said cylinder into first and second chamber portions;

piston rod means, said piston rod means having a first end connected with said piston means, and a second end extending from said piston means out of said first end of said cylinder;

means for connecting said second end of said piston rod means to the other of the two objects;

said piston means comprising flow passage means for fluidly connecting said first and second chamber portions;

said piston means comprising at least first and second piston parts, said first and second piston parts having a base configuration for closing said flow passage means;

at least one of said first and second piston parts being movable with respect to the other of said first and second piston parts to an open configuration for opening said flow passage means;

means for opposing movement of said at least one of said first and second piston parts to return said first and second piston parts to said base configuration;

means for permitting movement of said movable one of said first and second piston parts a substantial distance prior to opening of said flow passage means;

at least one of said first and second piston parts having a surface movable between said base configuration and said open configuration; and means for exposing a first cross sectional area of said movable surface to the hydraulic fluid pressure in one of said first and second chamber portions when said at least one of said first and second piston parts is in said base configuration, and for exposing a second cross sectional area of said movable surface to the hydraulic fluid pressure in said one of said first and second chamber portions when said at least one of said first and second piston parts is in said open configuration;

said second cross sectional area being substantially greater than said first cross sectional area.

18. The device according to claim 17, wherein:

said first piston part comprises a radially inner piston part and said second piston part comprises a radially outer piston part comprising a portion disposed radially outwardly to at least one of said first and second piston parts is displaceable axially within said cylinder with respect to the other of said first and second piston parts to open and close said flow passage; and said movable surface is substantially transverse to an axis of movement of said piston means between said base configuration and said open configuration.

19. The device according to claim 18, wherein:

said piston rod means is insertable into said cylinder in a first axial direction to increase hydraulic pressure in said first chamber portion and force fluid under pressure from said first chamber portion through said flow passage means and into said second chamber portion;

said piston rod means is withdrawable out of said cylinder in a second axial direction opposite to said first axial direction to increase hydraulic pressure in said second chamber portion and force fluid under pressure from said second chamber portion through said flow passage means and into said first chamber portion;

said first piston part is disposed about said piston rod means, and said first piston part comprises means for sealing with said piston rod means;

said second piston part comprises means for sealing with said cylinder and means for sealing to said first piston part; and said first and second piston parts comprise means for controlling flow of fluid through said flow passage during at least one of:
insertion of said piston rod into said cylinder, and withdrawal of said piston rod out of said cylinder.

20. The device according to claim 19, wherein:

said flow passage means comprises a first passage portion between said first chamber portion and said second chamber portion;

said first and second piston parts comprising means for opening and closing said first passage portion during insertion of said piston rod into said cylinder;

said flow passage means comprises a second passage portion between said first chamber portion and said second chamber portion;

said piston comprises third and fourth piston parts, said third piston part comprises another said first valve portion and said second piston part comprises another said second valve portion;

said third piston part comprises a radially inner piston part and said fourth piston part comprises a radially outer piston part disposed about at least a portion of said radially inner third piston part;

at least one of said third and fourth piston parts is displaceable axially within said cylinder with respect to the other of said third and fourth piston parts to open and close said second passage portion;

said third piston part is disposed about said piston rod means, and said third piston part comprises means for sealing with said piston rod means;

said fourth piston part comprises means for sealing with said cylinder and means for sealing with said third piston part; and said third and fourth piston parts comprise means for controlling flow of fluid through said flow passage during withdrawal of said piston rod out of said cylinder.

21. The hydraulic strut according to claim 1, wherein said movable surface is transverse to an axis of movement of said piston means between said base configuration and said open configuration.

22. The hydraulic strut according to claim 21:

wherein said first valve portion comprises a first piston part connected to, at least partially surrounding and extending radially outward from said piston rod means;

wherein said second valve portion comprises a second piston part contacting and extending radially inward from said cylinder to a point adjacent said first valve portion; and wherein said first valve portion additionally comprises an annular member surrounding said piston rod means and disposed adjacent said first piston part, said annular member being biased against said first piston part by said means for retaining said first and second valve portions in said base configuration.

23. The hydraulic strut according to claim 22:

wherein the outward radial extension of said first piston part varies along the axis of movement of said piston means between said base configuration and said open configuration, said first piston part having a portion of greatest radial extension outward from said piston means, said portion of greatest radial extension outward contacting said second annular member in said base configuration and not contacting said annular member in said open configuration.

24. The hydraulic strut according to claim 23:

wherein said annular member comprises a cup-shaped member, comprising a substantially planar bottom portion abutting, in said base configuration, said first piston part, said cup-shaped member additionally comprising a peripheral wall upstanding from said bottom portion and surrounding, in said base configuration, at least a portion of said first piston part;

said substantially planar bottom portion of said cup-shaped member having at least one throughgoing aperture; and wherein said movable surface comprises the surface of said second piston part transverse to said axis of movement of said piston means, and the surface of said substantially planar bottom portion of said cup-shaped member.

* * * * *

UNITED STATES PATENT AND TRADEMARK OFFICE
CERTIFICATE OF CORRECTION

PATENT NO. : 5,560,456
DATED : October 1, 1996
INVENTOR(S) : Klaus KOCH and Heinz-Josef HEINRICHS It is certified that error appears in the above-indentified patent and that said Letters Patent is hereby corrected as shown below:

In column 28, line 35, Claim 18, after 'to' insert --at least a portion of said radially inner piston part;--.

Signed and Sealed this

Eighteenth Day of February, 1997

Attest:

BRUCE LEHMAN

Attesting Officer     Commissioner of Patents and Trademarks